United States Patent
Foust et al.

(10) Patent No.: US 9,815,674 B2
(45) Date of Patent: Nov. 14, 2017

(54) PIN PULLER FOR CRANE CONNECTIONS

(71) Applicants: Bronson E. Foust, Mishicot, WI (US); Kenneth J. Porubcansky, Whitelaw, WI (US)

(72) Inventors: Bronson E. Foust, Mishicot, WI (US); Kenneth J. Porubcansky, Whitelaw, WI (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 356 days.

(21) Appl. No.: 13/841,082

(22) Filed: Mar. 15, 2013

(65) Prior Publication Data
US 2014/0231374 A1     Aug. 21, 2014

Related U.S. Application Data

(60) Provisional application No. 61/767,529, filed on Feb. 21, 2013.

(51) Int. Cl.
*B66C 23/70*     (2006.01)
*B66C 23/68*     (2006.01)
(Continued)

(52) U.S. Cl.
CPC .............. *B66F 19/00* (2013.01); *B25B 27/04* (2013.01); *B66C 23/68* (2013.01); *B66C 23/70* (2013.01);
(Continued)

(58) Field of Classification Search
CPC ....... B66C 23/00; B66C 23/26; B66C 23/286; B66C 23/305; B66C 23/346; B66C 23/62;
(Continued)

(56) References Cited

U.S. PATENT DOCUMENTS

| 4,141,455 A | * | 2/1979 | Henderson ............ B66C 23/702 212/300 |
| 4,621,742 A | * | 11/1986 | Rathi ............................. 212/177 |
| 4,828,124 A | * | 5/1989 | Iga ................................. 212/300 |
| 5,263,810 A | | 11/1993 | Takekata et al. |
| 5,673,805 A | * | 10/1997 | Chaffin .......................... 212/347 |

(Continued)

FOREIGN PATENT DOCUMENTS

| JP | H09-67085 A | 3/1997 |
| JP | H09-278373 A | 10/1997 |

(Continued)

OTHER PUBLICATIONS

European Search Report for EP Application No. 14154819, dated May 5, 2014 (7 pages).

*Primary Examiner* — Sang Kim
*Assistant Examiner* — Juan Campos, Jr.
(74) *Attorney, Agent, or Firm* — Ramey & Schwaller LLP; Craig Buschmann

(57) ABSTRACT

A pin puller is mounted between first and second connectors, preferably connectors on a lift crane, each of the connectors having a hole there though. The pin puller includes: a) first and second support frame members; b) a first pin with a first end located in the hole of the first connector and a second end inside the first support frame member; c) a second pin with a first end located in the hole of the second connector and a second end inside the second support frame member; d) at least one linear actuator connected to the first and second pins; and e) a length adjustment device between the first and second support frame members, with its length adjusted so as to force the first support frame member into contact with the first connector and the second support frame member into contact with the second connector.

37 Claims, 18 Drawing Sheets

(51) Int. Cl.
  *B25B 27/04* (2006.01)
  *B66F 19/00* (2006.01)
  *B23P 19/027* (2006.01)
  *B23P 19/02* (2006.01)

(52) U.S. Cl.
  CPC .......... *B23P 19/025* (2013.01); *B23P 19/027* (2013.01); *Y10T 29/49826* (2015.01)

(58) Field of Classification Search
  CPC ......... B66C 23/64; B66C 23/66; B66C 23/70; B66C 23/708
  USPC .......... 212/175, 347; 254/93 R, 120; 29/428
  See application file for complete search history.

(56) References Cited

U.S. PATENT DOCUMENTS

| | | | |
|---|---|---|---|
| 6,036,035 A * | 3/2000 | Asano | B66C 23/702 |
| | | | 212/168 |
| 6,848,522 B2 | 2/2005 | Moore et al. | |
| 7,753,640 B2 | 7/2010 | Miyazaki | |
| 8,522,988 B2 * | 9/2013 | Tanaka et al. | 212/300 |
| 2004/0104192 A1 * | 6/2004 | Stowasser et al. | 212/348 |
| 2009/0139948 A1 | 6/2009 | Holly et al. | |
| 2010/0226710 A1 | 9/2010 | Yamasaki | |

FOREIGN PATENT DOCUMENTS

| | | |
|---|---|---|
| JP | 2001-341981 A | 12/2001 |
| JP | 2005-249185 A | 9/2004 |
| JP | 2005249185 | 9/2005 |
| JP | 2011-042460 A | 3/2011 |

* cited by examiner

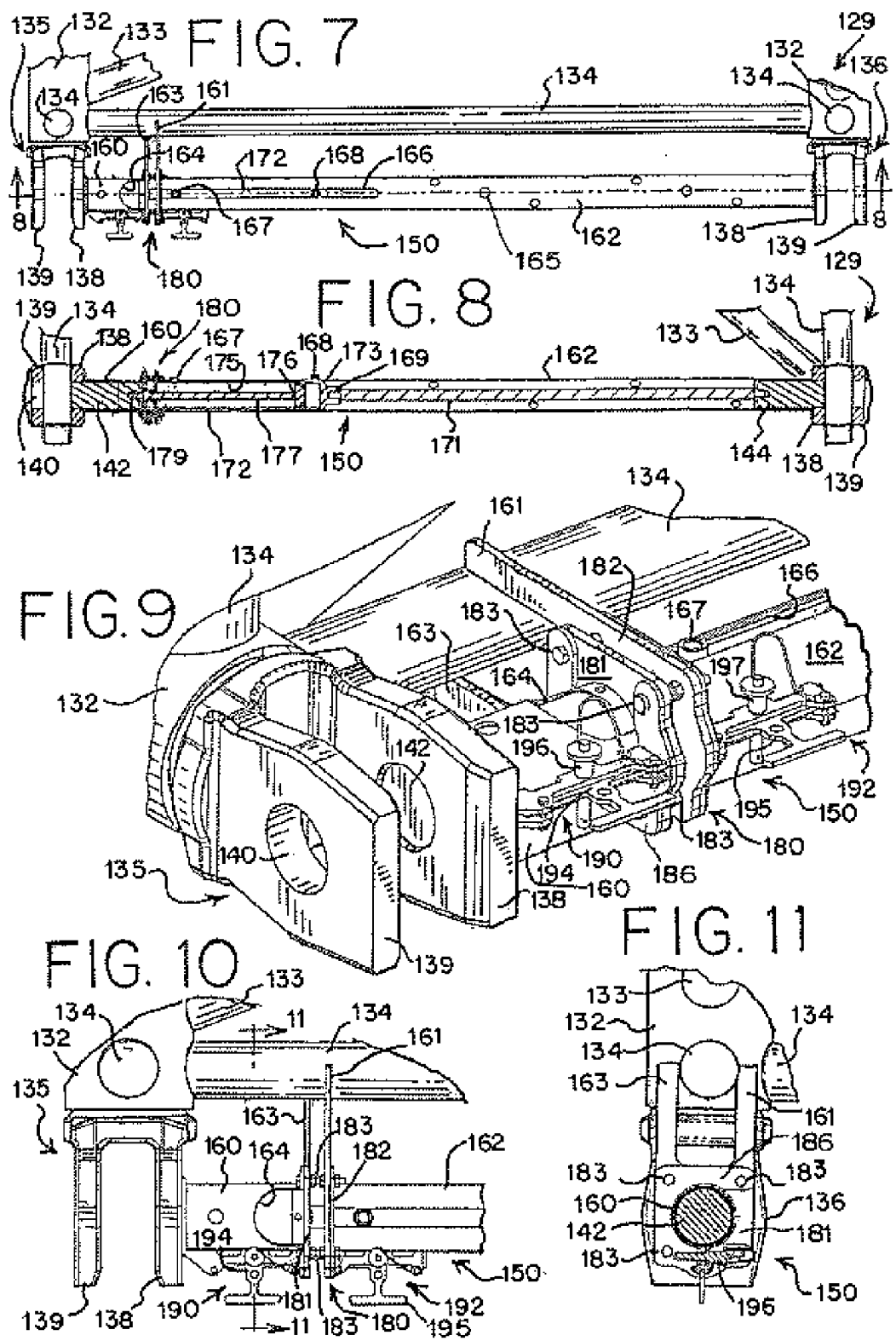

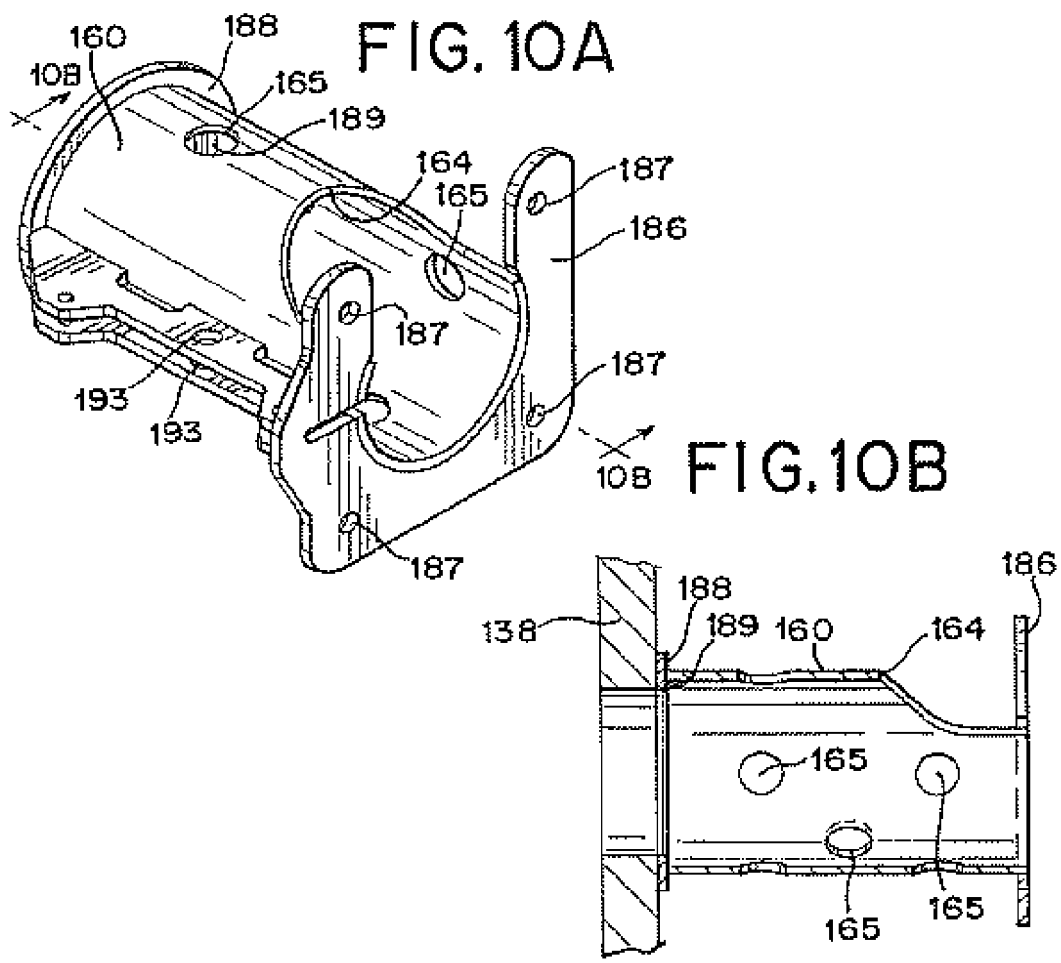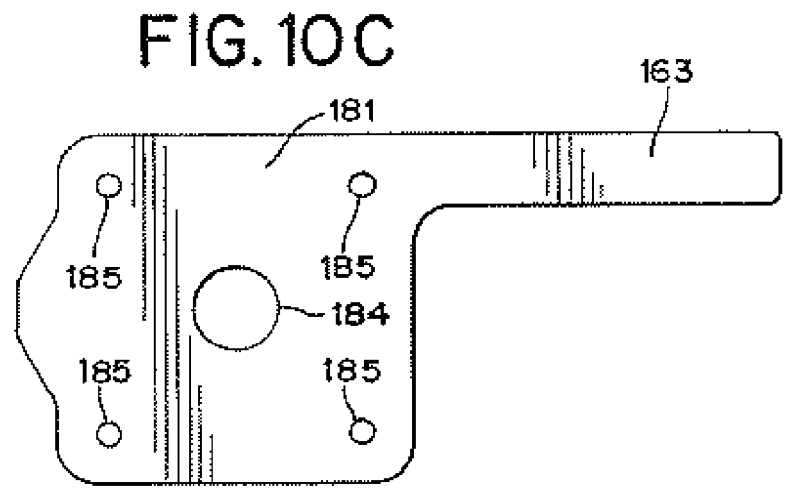

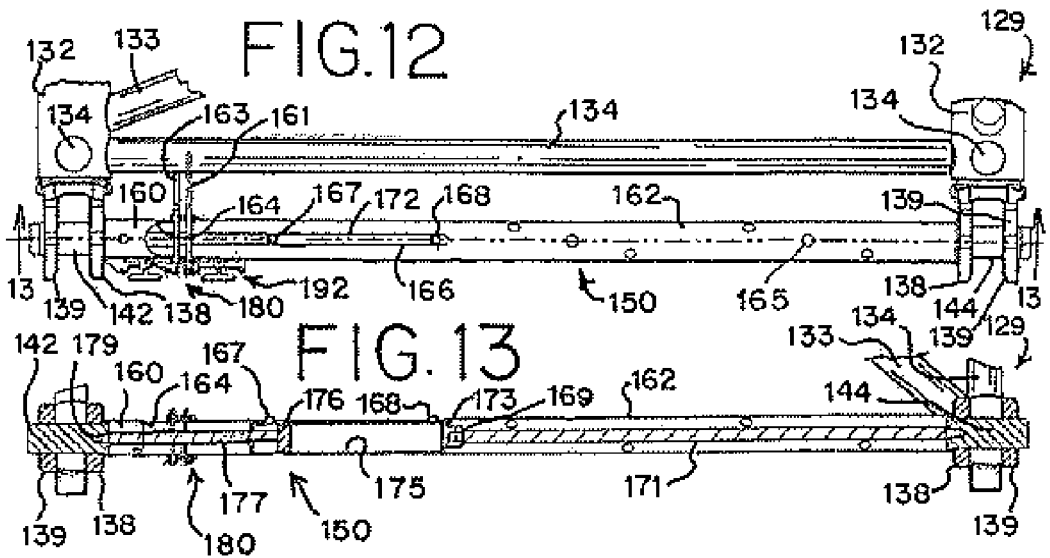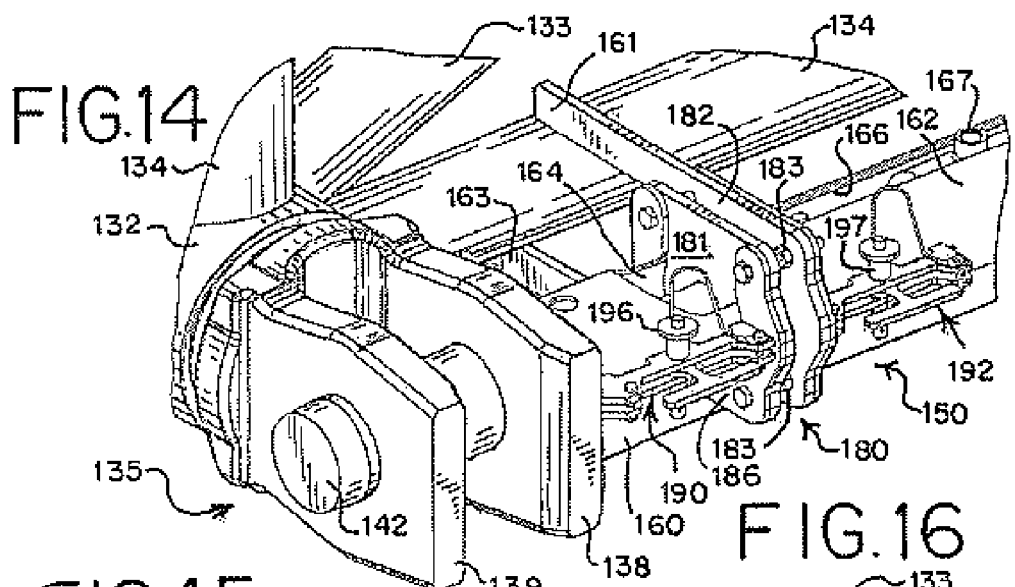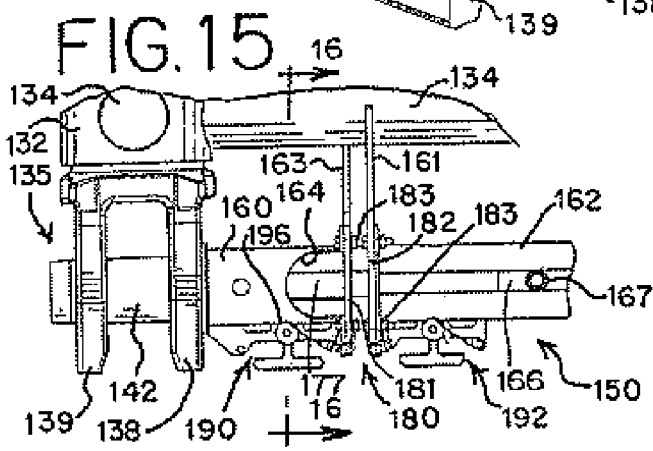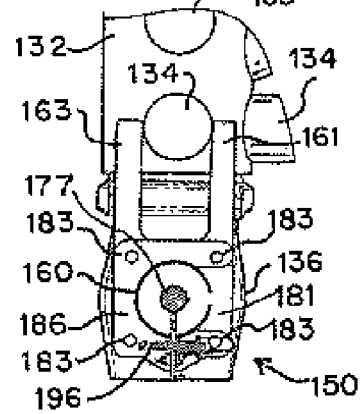

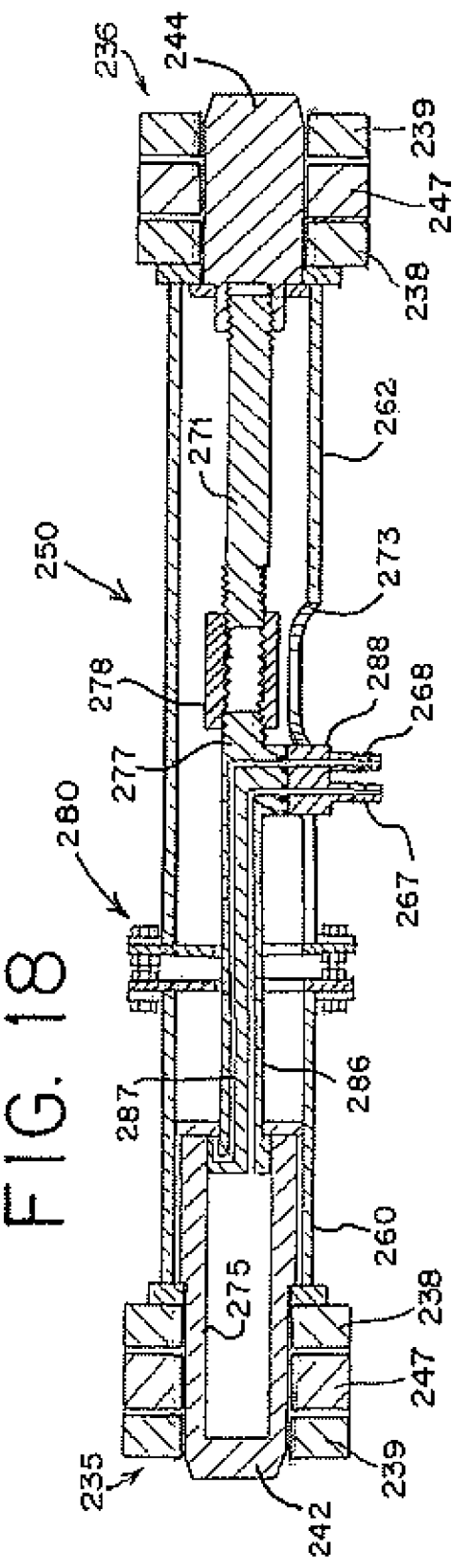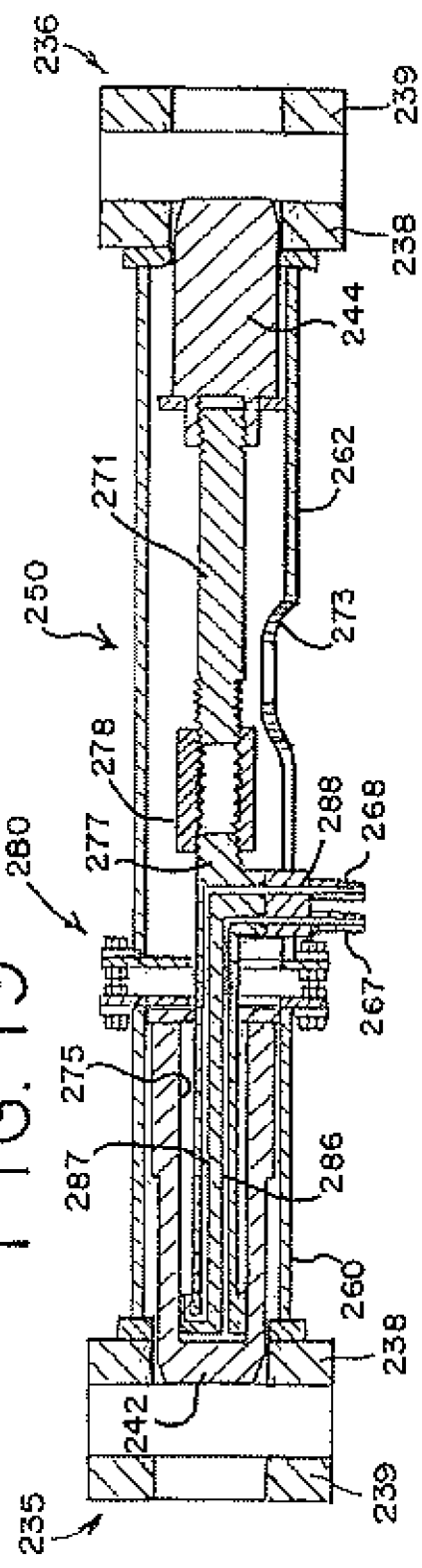

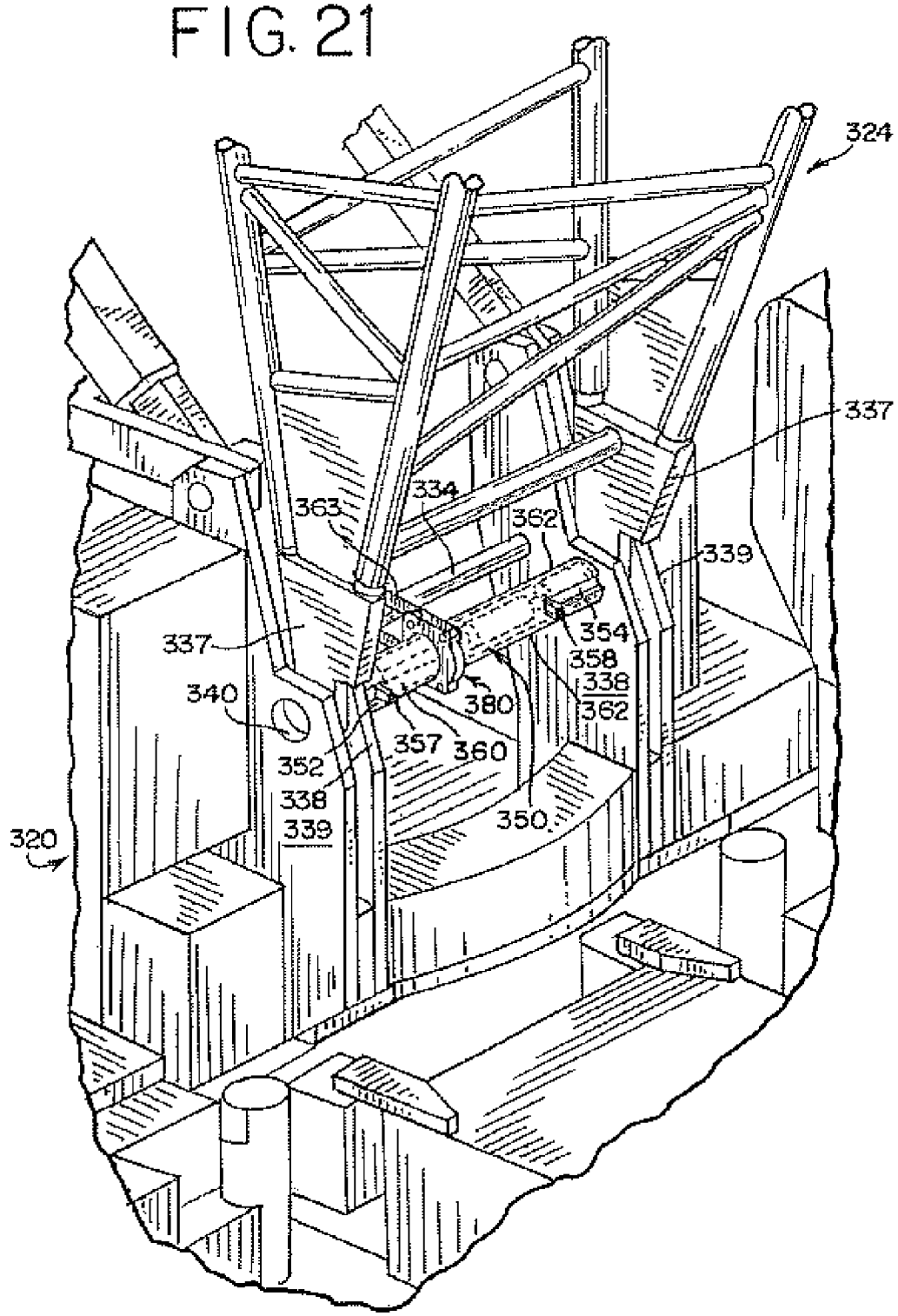

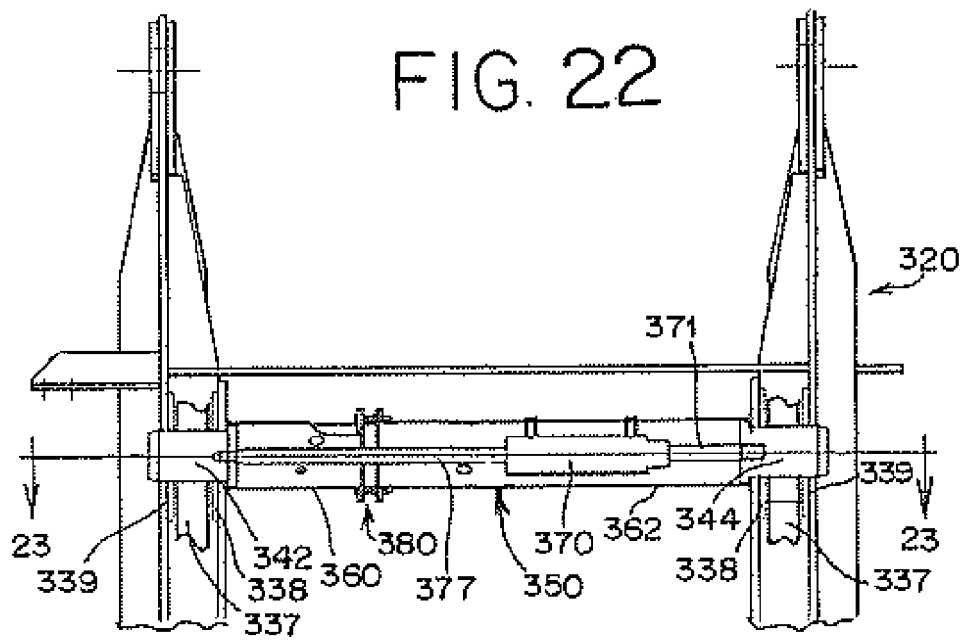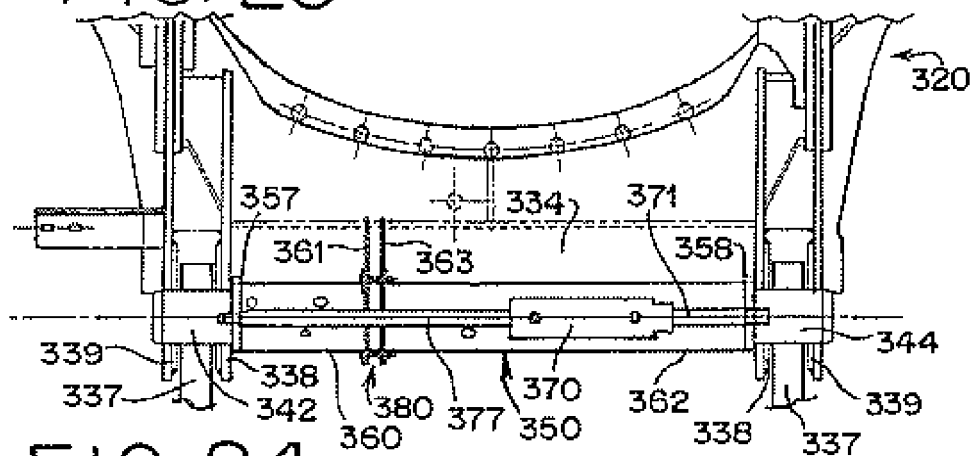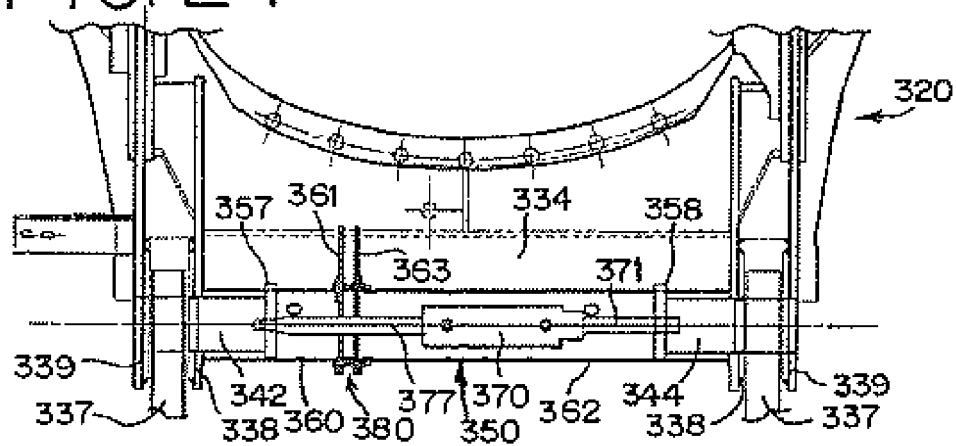

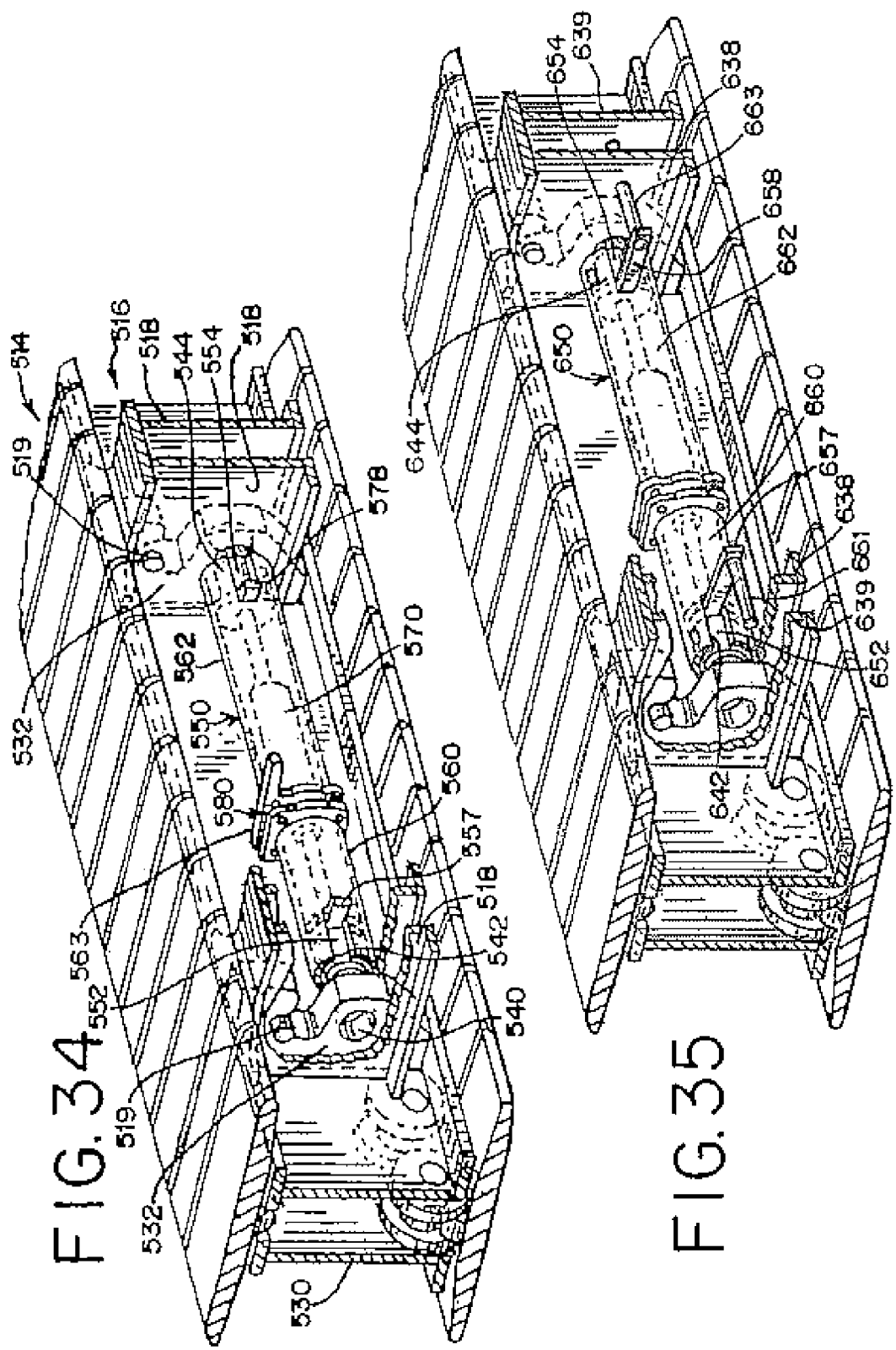

PIN PULLER FOR CRANE CONNECTIONS

REFERENCE TO EARLIER FILED APPLICATION

The present application claims the benefit of the filing date under 35 U.S.C. §119(e) of Provisional U.S. Patent Application Ser. No. 61/767,529, filed Feb. 21, 2013; which is hereby incorporated by reference in its entirety.

BACKGROUND

The present invention relates to a pin insertion and pulling device, more commonly known as a pin puller, particularly a pin puller that can be used to manipulate pins used for connecting large pieces of machinery together, such as the connections on large lift cranes.

Mobile lift cranes typically include a carbody having moveable ground engaging members; a rotating bed rotatably connected to the carbody such that the rotating bed can swing with respect to the ground engaging members; a boom pivotally mounted on a front portion of the rotating bed, with a load hoist line extending therefrom, and counterweight to help balance the crane when the crane lifts a load. Additionally, when the crane needs to work on particularly high buildings or structures, or in restricted spaces, a luffing jib pivotally mounted at the top of the boom may be extended out to provide required reach. When the luffing jib is employed, one or more luffing jib struts are connected to the top of the boom or bottom of the luffing jib. These struts support the luffing jib rigging and backstay straps, providing a moment arm about which force can be applied to raise the jib and support a load being lifted by the luffing jib.

Since the crane will be used in various locations, it needs to be designed so that it can be transported from one job site to the next. This usually requires that the crane be dismantled into components that are of a size and weight that they can be transported by truck within highway transportation limits. The ease with which the crane can be dismantled and set up has an impact on the total cost of using the crane. Thus, to the extent that fewer man-hours are needed to set up the crane, there is a direct advantage to the crane owner or renter.

Many of the connections that are used when assembling a crane involve placing a pin through holes of two aligned connectors, resulting in a pinned connection. Frequently these connections come in pairs. For example, a boom is hinged to the rotating bed through two pins that connect the boom butt to the rotating bed. Crawlers are often pinned at the ends of legs of a carbody. Lattice members making up columns on the crane are pinned together. For example, a luffing jib strut may be made from two or more sections that are transported to a job site and connected together. However, in some instances the luffing jib strut may be lifted while it is folded, connected on only one side, and when it is ready to be deployed it has to be lifted to where it is straight and then two pills inserted to complete the connection of the two lattice sections making up the luffing jib strut.

Pin pullers are linear actuating devices that push or pull pins into and out of a working configuration when pinning multiple structural members together. They are commonly seen on heavy lift cranes and other heavy equipment when pins get too large to handle manually, the pin connection is in a hard to reach location, or for ease of equipment assembly. Pin pullers are often but not limited to being activated with linearly acting hydraulic or pneumatic cylinders. Sometimes these pin pullers are dedicated to moving just a single pin, and stay attached to the crane next to the pin while the crane is operated. Other times the pin puller is portable, and can be mounted at different places on the crane during assembly and disassembly operations.

Especially when the pin pullers are used in one dedicated place on the crane, there is a need to mount the pin puller to the connector to which the pin is being inserted or from which it is being extracted during a disassembly operation. The connector itself may be fabricated or cast and then machined. Because the pins often carry loads through the pins, the pins must fit tight in the connections. As a result, the pins, and any associated pin puller, must be centered with respect to the holes the pin is inserted in. This often requires precise machining and tolerances when it comes to mounting the pin puller to the connector. Further, the connector itself may need to be larger than is necessary for connecting the crane parts together just so that there is room and structure to mount the pin puller to the connector, since that mounting has to be substantial enough that the pin puller can exert the required force to move the pin into and out of its working position, such as extending through multiple holes in adjacent connectors.

For example, in a pin puller used in a carbody-to-crawler connection on a known mobile lift crane, one hydraulic cylinder is threaded directly to a single pin. A support frame is bolted and piloted via machined surfaces directly to the parent component (carbody). The hydraulic cylinder bolts to this frame to transmit the cylinder force of inserting or removing of the pin to the parent component via the bolts attaching the support frame to the parent component. The support frame also prevents axial rotation of the hydraulic cylinder to prevent entanglement of the supply and return hydraulic lines going to the hydraulic cylinder. Even though the pin may be piloted, the pin is not self-centering because the pin puller is rigidly attached to the parent component. As a result, pin centering is only achieved through accurate machining of the pin puller component itself, and requires much additional machining to achieve accurate attachment to the parent component.

BRIEF SUMMARY

A pin puller has been invented for use on a crane and other equipment that does not require a support frame to be bolted or welded to the component to which it is attached. In a first aspect, the invention is a pin puller mounted between first and second connectors, each of the connectors having a hole there though, the pin puller comprising: a) first and second support frame members; b) a first pin with a first end located in the hole of the first connector and a second end inside the first support frame member; c) a second pin with a first end located in the hole of the second connector and a second end inside the second support frame member; d) at least one linear actuator connected to the first and second pins, the at least one linear actuator moveable between i) an extended state wherein the pins are extended all of the way though the holes in the first and second connectors and ii) a retracted state wherein the first ends of each of the pins do not extend out of the holes of the connectors; and e) a length adjustment device between the first and second support frame members, with its length adjusted so as to force the first support frame member into contact with the first connector and the second support frame member into contact with the second connector.

In a second aspect, the invention is a method of connecting a pin puller between first and second connectors each having a hole there through, wherein the pin puller comprises first and second support frame members, first and second pins and at least one linear actuator, the method comprising the steps of: a) placing the first pin in the first support frame member; b) placing the second pin in the second support frame member; c) placing at least a part of the at least one linear actuator in at least one of the support frame members wherein the part of the linear actuator is connected to a second end of one of the first and second pins; d) placing the support frame members between the two connectors so that the first and second pins are respectively aligned with the holes in the first and second connectors; e) extending a first end of the first pin into the hole of the first connector; f) extending a first end of the second pin into the hole of the second connector; g) connecting the linear actuator to a second end of the other of the first and second pins; and h) adjusting the length of a length adjustment device between the first and second support frame members to force the first support frame member into contact with the first connector and the second support frame member into contact with the second connector.

Accordingly, the present invention includes solutions to the above drawbacks with previous pin pullers. Using the present preferred embodiment, the connector does not have to be machined and the pin puller accurately bolted to it. The connector itself can be smaller in size than would be necessary if the pin puller were mounted to it. These and other advantages of the invention, as well as the invention itself, will be more readily understood in view of the attached drawings, in which:

BRIEF DESCRIPTION OF THE DRAWINGS

FIG. 3 displays the pivotal connection of a second strut section, including an assembled main strut top and second insert, to the first insert such that the main strut is folded on itself, and the connecting of the main strut cap to the strut top of the main strut. FIG. 4 displays the retracting of a rigging winch line while lifting the main strut top with a raising pendent attached thereto, to close the folded main strut, thus completing assembly of the luffing jib struts.

FIG. 7 is a rear elevational view of the pin puller of FIG. 5 on the lower end of the top half of the main strut when the main strut is being raised, with the pins in a retracted state.

FIG. 8 is a cross-sectional view taken along line 8-8 of FIG. 7.

FIG. 9 is an enlarged perspective view of the left end (from the perspective of FIG. 7) of the pin puller of FIG. 7.

FIG. 10 is an enlarged plan view of the left side of FIG. 7.

FIG. 10A is a perspective view of the first support frame member seen in FIG. 10.

FIG. 10B is a cross-sectional view taken along line 10B-10B of FIG. 10A, also including one lug of the connector.

FIG. 10C is a side elevational view of one of the spacer plates used in the length adjustment device seen in FIG. 10.

FIG. 11 is a cross-sectional view taken along line 11-11 of FIG. 10.

FIG. 12 is a rear elevational view of the pin puller of FIG. 5 on the lower end of the top half of the main strut when the main strut is being raised, with the pins in an extended state and the keepers locked in an operational position.

FIG. 13 is a cross-sectional view taken along line 13-13 of FIG. 12.

FIG. 14 is an enlarged perspective view of the left end of the pin puller of FIG. 12.

FIG. 15 is an enlarged plan view of the left side of FIG. 12.

FIG. 16 is a cross-sectional view taken along line 16-16 of FIG. 15.

FIG. 18 is a cross-sectional view taken along line 18-18 of FIG. 17.

FIG. 19 is a cross-sectional view like FIG. 18 but with the pins in a retracted state.

FIG. 21 is an enlarged partial front perspective view of the crane of FIG. 20 showing the mounting of a pin puller of the present invention to the boom hinge pins.

FIG. 22 is a partial front elevational view of the pin puller of FIG. 21 with the pins in an extended state.

FIG. 23 is a view taken along line 23-23 of FIG. 22.

FIG. 24 is a view like FIG. 22 but with the pins in a retracted state.

FIG. 34 is a perspective view of the pin puller of FIGS. 31-33.

FIG. 35 is a perspective view like FIG. 34 but of another embodiment of a pin puller of the present invention.

DETAILED DESCRIPTION OF THE DRAWINGS AND THE PRESENTLY PREFERRED EMBODIMENTS

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The preferred embodiment of the present invention relates to a high capacity mobile lift crane, other aspects of which are disclosed in co-pending United States Patent Application Publication No. US 2010/0243595 A1 entitled "Folding Jib Main Strut and Transportable Reeved Strut Caps," which is hereby incorporated by reference.

Several terms used in the specification and claims have a meaning defined as follows.

The term "mounted" includes immobilizing the component to the structure to which it is mounted.

The termed "pinned" (and variations thereof, such as "pinning") is meant to designate a connection between components that allows for the transfer of forces between the components, and also allows the connection to be easily disassembled. Most typically, a pinned connection is one that transfers force though shear forces on a pin passing through holes in the two connected structures. In addition to pins, bolts can be used to make a "pinned" connection as that term is used herein.

Figure 20:
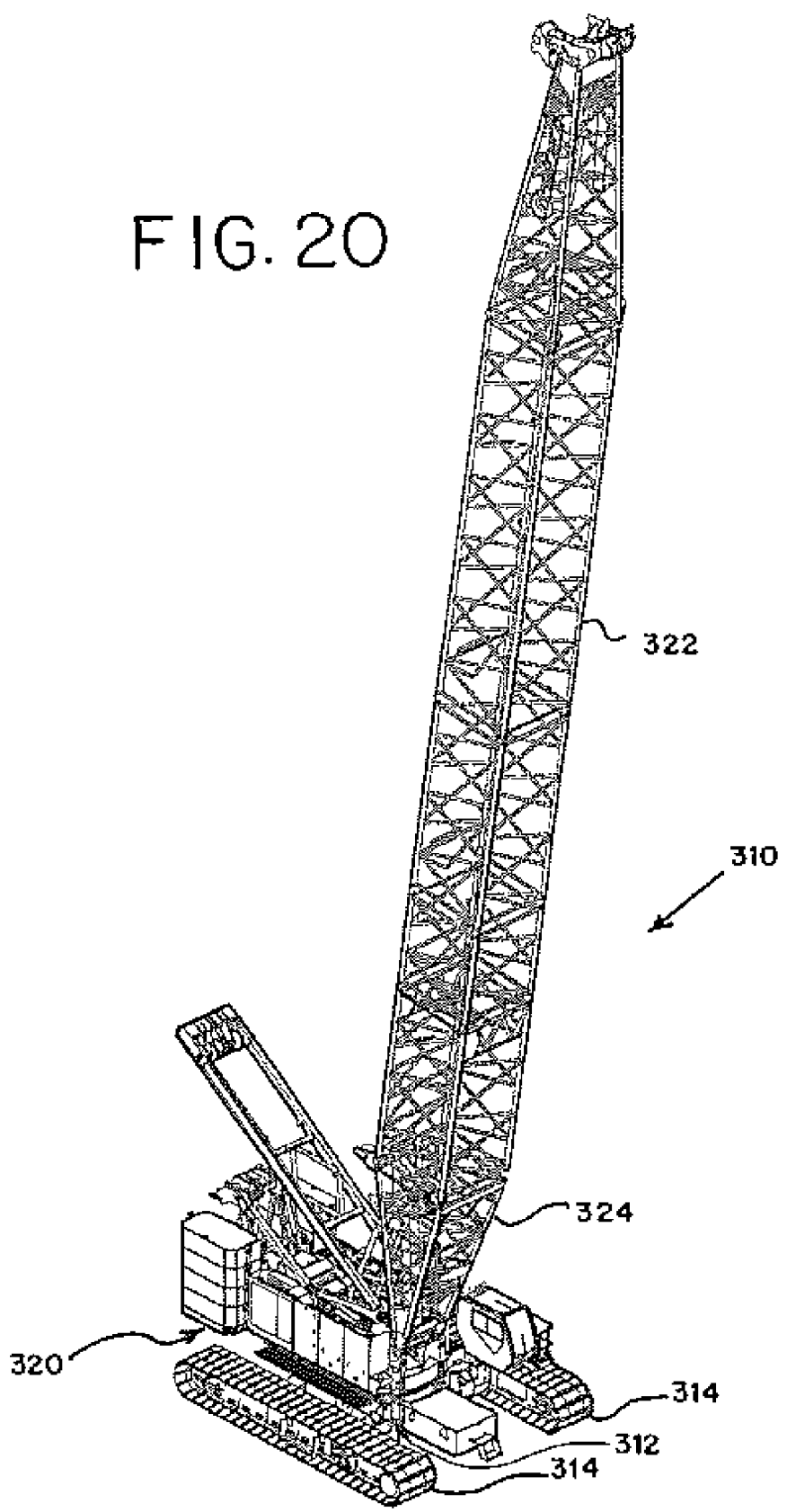
FIG. 20 is a perspective view of a second mobile lift crane fitted with other embodiments of a pin puller of the present invention.

While the invention will have applicability to many types of cranes, it will be described in connection with three mobile lift cranes, shown in FIGS. 1, 20 and 29. The mobile lift crane 10, shown in an operational configuration in FIG. 1, includes lower works, also referred to as a carbody 12, and moveable ground engaging members in the form of crawlers 14 and 16. There are two front crawlers 14 and two rear crawlers 16, only one each of which can be seen from the side view of FIG. 1. In the crane 10, the ground engaging members could be a pair of crawlers, one crawler on each side. Of course, additional crawlers than those shown can be used, as well as other types of ground engaging members, such as tires.

A rotating bed 20 is rotatably connected to the carbody 12 such that the rotating bed can swing with respect to the ground engaging members. The rotating bed is mounted to the carbody 12 with a slewing ring or roller path, such that the rotating bed 20 can swing about an axis with respect to the ground engaging members 14, 16. The rotating bed supports a boom 22 pivotally mounted on a front portion of the rotating bed; a mast 28 mounted at its first end on the rotating bed, with a lower equalizer 47 connected to the mast adjacent the second end of the mast; a backhitch 30 connected between the mast 28 and a rear portion of the rotating bed 20; and a moveable counterweight unit 34. Counterweights used on the counterweight unit 34 may be in the form of multiple stacks of individual counterweight members (or blocks) 44 on a support member.

Boom hoist rigging (described in more detail below) between the top of mast 28 and boom 22 is used to control the boom angle and transfer load so that the counterweight can be used to balance a load lifted by the crane. A load hoist line 24 is trained over a pulley on the boom 22, supporting a hook block 26. At the other end, the load hoist line is wound on a first main load hoist drum 70 connected to the rotating bed, described in more detail below. The rotating bed 20 includes other elements commonly found on a mobile lift crane, such as an operator's cab, a hoist drum 50 for the boom hoist rigging, a second main hoist drum 80 and an auxiliary load hoist drum 90 for a whip line, also described in more detail below.

Figure 1:
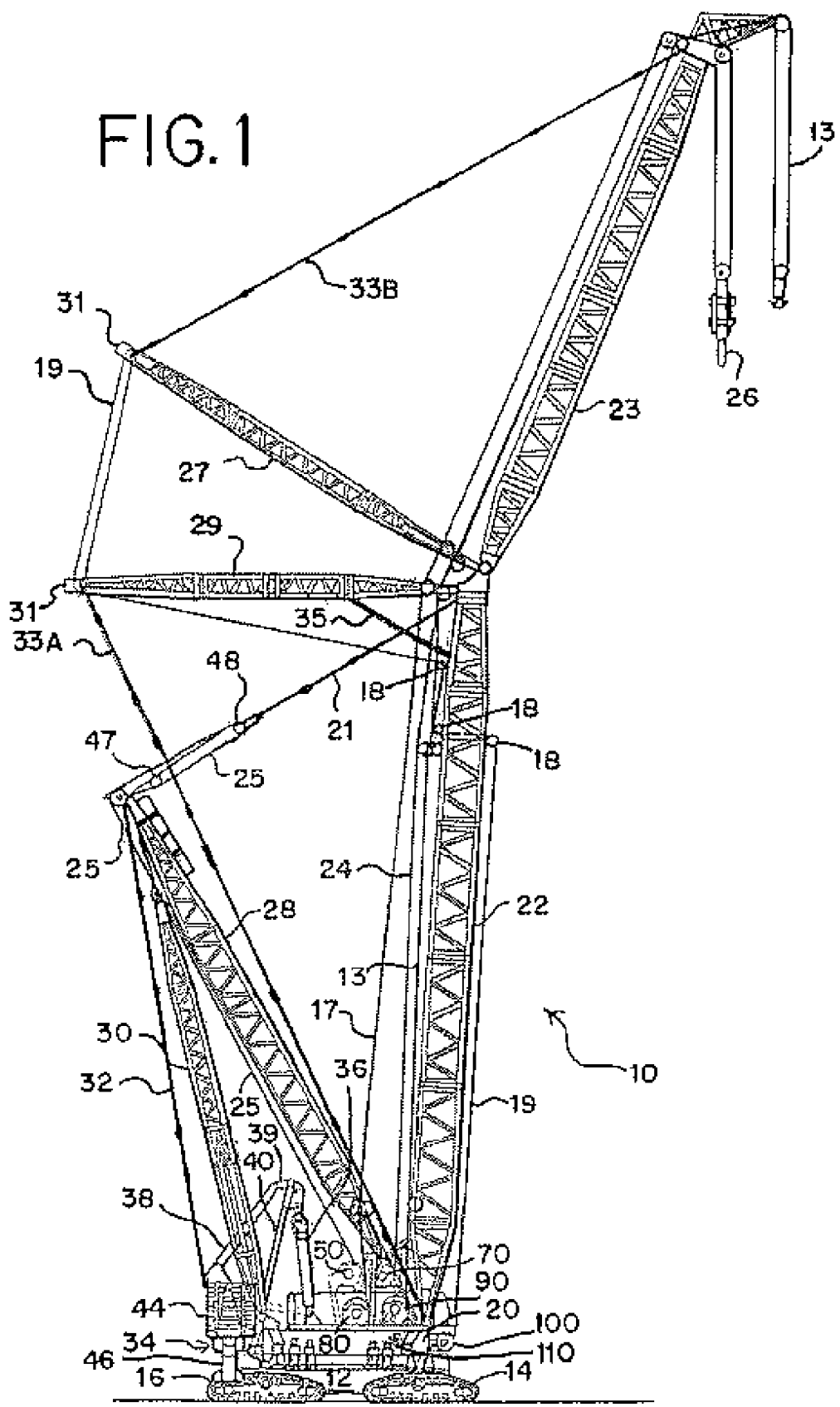
FIG. 1 is a side elevational view of a mobile lift crane fitted with a luffing jib and utilizing a pin puller of the present invention.

As shown in FIG. 1, the boom 22 includes a luffing jib 23 pivotally mounted to the top of the main boom 22. The crane also includes first and second luffing jib struts, also referred to herein respectively as the jib strut 27 and main strut 29, as well as associated luffing jib rigging and a luffing jib hoist drum 100, which in the embodiment depicted is mounted on the front roller carrier of the rotating bed 20. In other embodiments, the luffing jib hoist drum may be attached to the main boom 22, the mast 28, or another structure that is mounted to the rotating bed 20. A luffing jib hoist line 19 runs from the drum 100, through one or more wire guides 18, and lip to the rigging that controls the angle between the jib and main struts 27, 29. In one embodiment, the luffing jib hoist line 19 is a wire rope of about 34 mm in thickness. The rigging that controls the angle between the struts includes first and second strut caps 31, each respectively attached to the first and second struts 27, 29. The jib hoist line 19 is reeved through sheaves of the first and second strut caps 31. The strut cap 31 of a strut is detachable in some embodiments. The luffing jib hoist line 19 dead ends on either of the strut caps 31 or on one of the first and second struts 27, 29.

Two backstay straps 33A are connected between the end of the main strut 29, e.g., to the cap thereof, and the bottom of the boom 22. These backstay straps are made of multiple fixed-length sections. Selection of the number of sections and the length of each section allows changing the hypotenuse of the fixed-angle triangle formed between the main strut 29 and the boom 22 to accommodate different boom lengths. By changing the length of the backstay straps 33A, a constant angle may be maintained between the main strut 29 and the boom 22 for each length of the boom for which the crane is designed.

Similarly, sections of jib support straps 33B may be connected between the end of the jib strut 27 and adjacent the top of the luffing jib 23 to maintain a constant angle. By using the jib support straps 33B as described, paying out or retracting the luffing jib hoist line 19 allows increasing or decreasing the angle between only the first and second luffing jib struts 27, 29. Furthermore, a strut stop 35 is connected between the main strut 29 and the boom 22 to provide support to the main strut 29 if no load is on the hook block 26 and the forces pulling the main strut down are more than the forces pulling the main strut up.

The backhitch 30 is connected adjacent the top of the mast 28, but down the mast far enough that it does not interfere with other items connected to the mast. The backhitch 30 may comprise a lattice member, as shown in FIG. 1, designed to carry both compression and tension loads. In the crane 10, the mast 28 is held at a fixed angle with respect to the rotating bed 20 during crane operations, such as a pick, move and set operation.

The counterweight unit 34 is moveable with respect to the rest of the rotating bed 20. A tension member 32 connected adjacent the top of the mast supports the counterweight unit in a suspended mode. A counterweight movement structure is connected between the rotating bed and the counterweight unit such that the counterweight unit may be moved to and held at a first position in front of the top of the mast, and moved to and held at a second position rearward of the top of the mast, described more fully in U.S. Pat. No. 7,546,928 and U.S. Pat. No. 7,967,158.

At least one linear actuation device 36, such as a hydraulic cylinder, or alternatively a rack and pinion assembly, and at least one arm pivotally connected at a first end to the rotating bed and at a second end to the a linear actuation device 36, are used in the counterweight movement structure of crane 10 to change the position of the counterweight. The arm and linear actuation device 36 are connected between the rotating bed and the counterweight unit such that extension and retraction of the linear actuation device 36 changes the position of the counterweight unit compared to the rotating bed. While FIG. 1 shows the counterweight unit in its most forward position, the linear actuation device 36 can be partially or fully extended, which moves the counterweight unit to mid and aft positions, or any intermediate position, such as when a load is suspended from the hook block 26.

In a preferred embodiment of the counterweight movement structure, a pivot frame 40, which may be a solid welded plate structure, is connected between the rotating bed 20 and the second end of the linear actuation device 36. A rear arm 38 is connected between the pivot frame 40 and the counterweight unit 34. The rear arm 38 may also be a welded plate structure with an angled portion 39 at the end that connects to the pivot frame 40. This allows the arm 38 to connect directly in line with the pivot frame 40. The backhitch 30 has an A-shape configuration, with spread-apart lower legs, which allows the counterweight movement structure to pass between the legs when needed.

The crane 10 may be equipped with a counterweight support system 46, which may be required to comply with crane regulations in some countries. The counterweight movement structure and counterweight support structure are more fully disclosed in U.S. Pat. No. 7,967,158.

Figure 2:
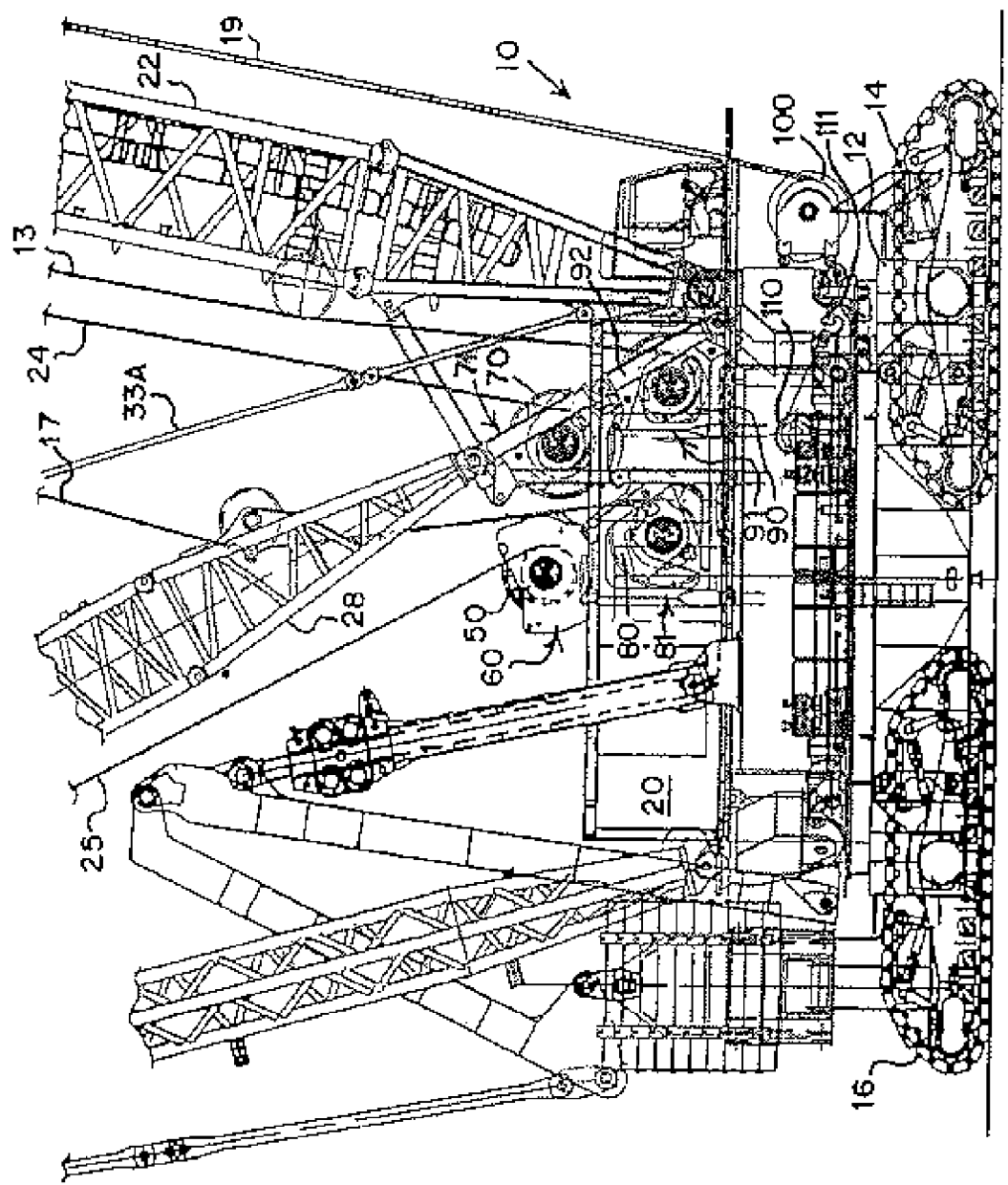
FIG. 2 is an enlarged side elevational view of the crane of FIG. 1 with some of the components removed for sake of clarity.

The boom hoist rigging includes a boom hoist line in the form of wire rope 25 wound on a boom hoist drum 50, and reeved through sheaves on a lower equalizer 47 and an upper equalizer 48. The boom hoist drum is mounted in a frame 60 (FIG. 2) connected to the rotating bed. The rigging also includes fixed length pendants 21 connected between the boom top and the upper equalizer 48. The lower equalizer 47 is connected to the rotating bed 20 though the mast 28. This arrangement allows rotation of the boom hoist drum 50 to change the amount of boom hoist line 25 between the lower equalizer 47 and the upper equalizer 48, thereby changing the angle between the rotating bed 20 and the boom 22.

The boom hoist drum frame 60, the lower equalizer 47 and the upper equalizer 48 each include cooperating attachment structures whereby the lower and upper equalizers can be detachably connected to the boom hoist drum frame so that the boom hoist drum, the lower equalizer, the upper equalizer and the boom hoist line can be transported as a combined assembly. The combined boom hoist drum 50, frame 60, lower equalizer 47 and upper equalizer 48, arranged as they would be for transportation between job sites, are described in U.S. Patent Application Publication No. US 2010/0072156-A1.

In a preferred embodiment, the crane includes four drums each mounted in a frame and connected to the rotating bed in a stacked configuration. (The rotating bed includes a main frame and front and rear roller carriers.) The jib hoist drum is mounted in a frame attached to the front surface of the front roller carrier. Frames of two of the four stacked drums are connected directly to the rotating bed, while the frames of the other two drums are indirectly connected to the rotating bed by being directly connected to at least one of the two drum frames connected directly to the rotating bed. In this case, the four stacked drums are preferably the first main load hoist drum 70 with load hoist line 24 wound thereon, the second main load hoist drum 80 with load hoist line 17 wound thereon, the auxiliary load hoist drum 90 with whip line 13 wound thereon, and the boom hoist drum 50 with boom hoist line 25 wound thereon. Preferably, the frame 91 of the auxiliary load hoist drum 90 and frame 81 of the second main load hoist drum 80 are connected directly to the rotating bed (the frame 91 pins at its front onto the front roller carrier), the frame 71 of the first main load hoist drum 70 is connected to both of frames 81 and 91, while the frame 60 for the boom hoist drum 50 is connected to frame 81. In that regard, the boom hoist drum frame 60 is thus stacked on top of and pinned directly to the second main load hoist drum frame 81, and the first main load hoist drum frame 71 is stacked on top of and pinned directly to the auxiliary load hoist drum frame 91. The drum frames are connected to the rotating bed and to each other by removable pins, allowing the frames to be disconnected from and transported separately from the rotating bed.

A sixth drum includes a rigging winch drum 110 on which is wound a rigging winch line 111. The rigging winch drum 110 is attached to a lower section of the rotating bed 20 and is generally a lesser drum than the others. The rigging winch line 111, in one embodiment, may be a 19 mm winch line that is generally used to help assemble the crane. The rigging winch line 111 may be employed to speed reeving the sheaves of the strut caps 31, and assembly of the main strut 29.

The strut caps 31 may be transported between job sites while reeved together as a pair, as described more fully in U.S. Patent Application Publication No. US 2010/0243595-A1. When reeved together, and possibly attached to one of the luffing jib struts 27, 29, the struts caps 31 may be easily transported and employed for use on the luffing jib struts 27, 29 during assembly of the crane.

Figure 3:
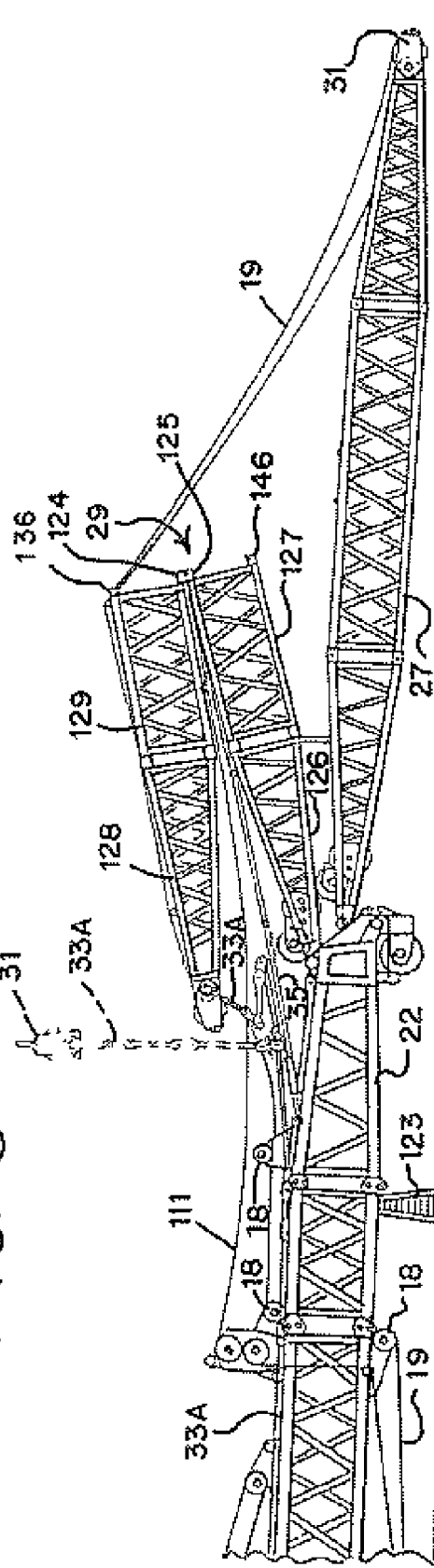
FIGS. 3 and 4 are side elevational views of the crane of FIG. 1, showing assembly and deployment of the luffing jib struts.

After arrival on a job site, the crane 10 may be erected to the point displayed in FIG. 3, which includes attachment of the jib strut 27 to the end of the boom 22. A support 123 may be deployed below the boom 22 to provide clearance for the rigging winch line 111 and the jib hoist line 19 below the boom. A first strut section, including an assembled main strut butt 126 and first insert 127, of the main strut 29 is pivotally connected to the top of the boom. The location of attachment to the boom 22 will be at a point somewhat distanced from the attachment point of the jib strut 27. The jib hoist line 19 may be temporarily positioned off to the side of the jib strut 27 while the main strut 29 is assembled, so that it is not in the way of that process.

Figure 4:
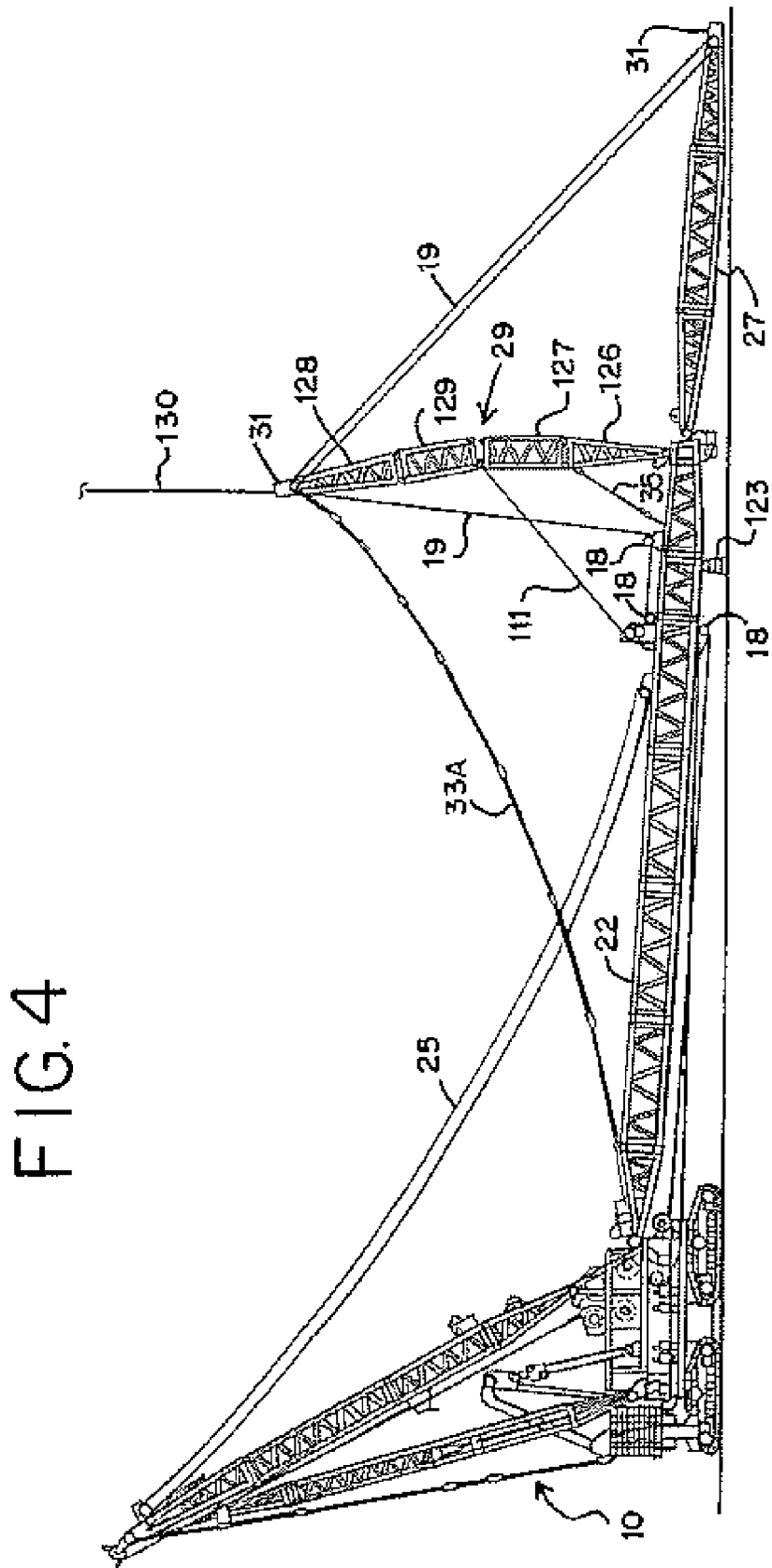

FIG. 3 also shows the attachment of the strut stop 35 between the boom 22 and the main strut butt 126. The strut stop 35 is configured to extend telescopically for attachment to the top of the main strut butt 126, but to retract to a shorter position once the main strut 29 is lifted to a closed position (FIG. 4). The rigging winch line 111 is connected to the main strut 29 at the top of the first insert 127 and helps in closing the main strut 29 (FIG. 4). A number of sections of the backstay straps 33A are pinned to the main strut cap 31 depending on the height of the boom 22. The number of sections of backstay straps 33A pinned to the bottom of the boom may be keep constant, for instance, and the number of sections of backstay straps 33A pinned to the main strut cap 31 may be selected according to length required for varying boom lengths. Also, the jib hoist line 19 is raised over on top of the folded main strut 29 in preparation for lifting the main strut cap 31 into the air.

The lifting of the main strait cap 31 and backstay straps 33A while paying out the reeved jib hoist line 19 is show in FIG. 3. The paying out of the jib hoist line 19 provides slack so that the main strut cap 31 (including the sections of backstay straps 33A) can be lowered to the strut top 128 of the main strut 29. The backstay straps 33A consist of a number of sections connecting the main strut cap 31 to the bottom of the boom 22, to complete the string of rigid backstay straps 33A between the main strut 29 and the boom 22 (FIG. 4).

The main strut cap 31 is then attached (pinned) to the top of the main strut 29, as shown in FIG. 3. The backstay straps are positioned underneath the strut top 128, on top of the strut stop 35, and if needed, the jib hoist line 19 is pulled in to take up excess slack on the reeved lines between the strut caps 31. Note that the sections of backstay straps 33A—those attached to the bottom of the boom and those attached to the main strut cap—could be pinned together, in alignment with each other, before or after the main strut cap 31 is attached to the main strut 29.

FIG. 4 displays paying in the rigging winch line 111 while lifting the main strut top 128, insert 129 and main strut cap 31. A raising pendant 130, or a rigid link, may be pinned to the strut top 128 or main strut cap 31, and be pivotal to be attached to the main strut 29 in a storage configuration and to be lifted to connect to an assist crane (not shown) in a lifting configuration. The assist crane may lift straight up on the raising pendant 130 while the rigging winch line 111 is payed into the rigging winch drum 110, causing the first and second inserts 127, 129 to come together as the main strut 29 straightens and closes. Accordingly, the assist crane need not travel, and assembly of the luffing jib struts is simplified.

The now closed ends of the strait inserts 127, 129 may then be pinned to each other as described in detail below to complete assembly of the jib main strut 29. The rigging winch line 111 is disconnected, as is the assist crane from the raising pendant 130. The raising pendant can be removed, or attached to the main strut 29 for storage during operation of the crane 10. The jib hoist line 19 may now be payed in to pull the jib strut 27 off the ground, generating room on the ground at the end of the boom 22 for attachment thereon of the luffing jib 23. While not displayed, sections of jib support straps 33B are pinned between the top of the luffing jib 23 and the end of the jib (or first) strut 27 (FIG. 1). Accordingly, a first number of sections of jib support straps 33B may be connected to the jib strut cap 31 before the jib strut 27 is pilled off the ground, to facilitate pinning of the first number of sections of jib support straps to the rest of the sections of jib support straps pinned to the end of the luffing jib 23.

Figure 5:
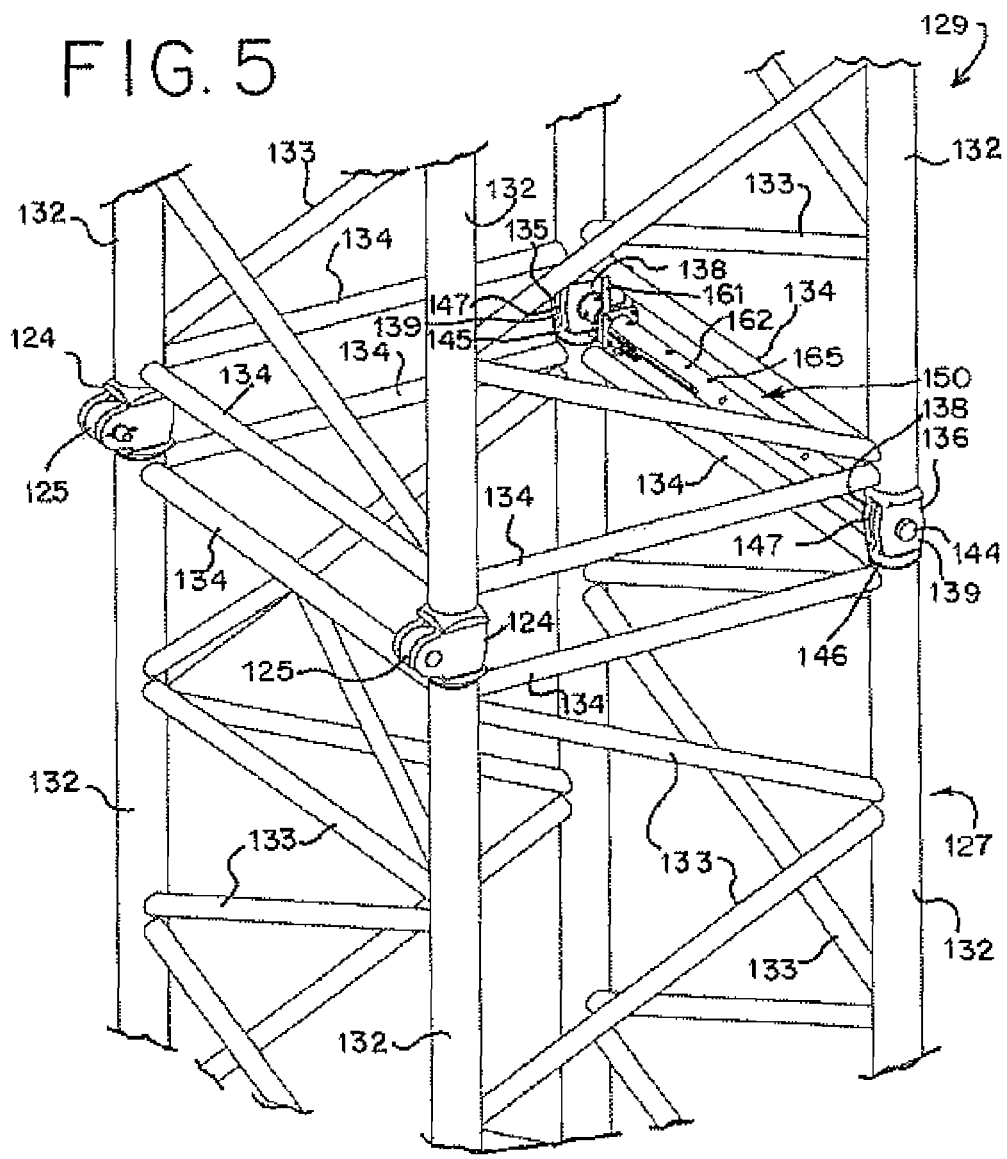
FIG. 5 is a rear perspective view of the connection of the hinged sections of the main strut, showing the mounting of a pin puller of the present invention to the lattice structure of the strut.

FIG. 5 shows a pin puller 150 used to connect the strut inserts 127 and 129 together after they have been brought into a working orientation with respect to each other. As noted earlier, the inserts 127 and 129 are lattice column sections, in this case with a rectangular cross-section. In the embodiment of FIGS. 5-16, the pin puller 150 is thus used to connect two lattice column sections together, wherein the lattice column sections comprise sections 127 and 129 of a main strut 29. As will be described hereafter, other embodiments of a pin puller of the present invention may be used to connect other sections of a crane together.

Each of the inserts 127 and 129 has chord members 132 at the corners of the rectangles, and lacing elements 133 between the chord members, including banding lacings 134 on the ends of the lattice column segments. The lacings 133 and 134 are shown as round tubular members, but they could be made from rectangular tubes, angle iron, etc. On the end of each chord 132, the inserts 127 and 129 include connectors. On the back side (where the inserts 127 and 129 are joined together before they are raised) the connectors 124 on insert 129 and the connectors 125 on insert 127 form a hinged joint. On the front side of the inserts, the first and second connectors 135, 136 on insert 129 form a double shear pinned connection with the first and second connectors 145, 146 on insert 127. While both connectors 145 and 146 includes a single plate or lug 147 with a hole there though, each connector 135 and 136 comprise first and second spaced lugs or plates 138 and 139 that each have a hole or bore 140 there through (FIG. 9).

The pin puller 150 is mounted between the connectors 135 and 136 on the insert 129. The pin puller 150 may also be referred to as a pin pusher, pin actuator or pin inserter, as it is used to both pull pins and insert pins. In the embodiment of FIGS. 5-16, the pin puller 150 is used to insert first and second pins 142 and 144 that connect respectively connectors 135 and 145 together and connectors 136 and 146 together. The pins are tapered for easier insertion into the aligning bores or holes 140.

The pin puller 150 includes several parts that cooperate with each other, with the pins and with the parts of the crane being pinned together. Because the pins 142 and 144 are assembled into the pin puller 150 before it is mounted to the rest of the crane structure, it may be considered that the pins are part of the pin puller. The other main parts of the pin puller 150 include first and second support frame members; at least one linear actuator connected to the first and second pins; and a length adjustment device between the first and second support frame members.

Figure 6:
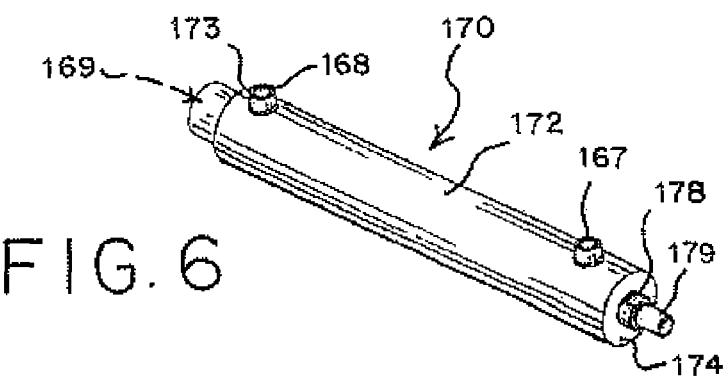
FIG. 6 is a perspective view of a hydraulic cylinder used in the pin puller of FIG. 5.

The linear actuator used in the pin puller 150 is shown in FIG. 6, and a cross section is seen in FIGS. 8 and 13. Preferably the linear actuator comprises a double acting hydraulic cylinder 170 having a housing 172 having a first sealed end 173, a second end 174 and an inside cylindrical surface 175, a piston 176 slidably contained within the housing in a sealing engagement with the inside cylindrical surface 175 of the housing, and a piston rod 177 having a first end connected to the piston 176 and a second end 179 extending out of the second end 174 of the housing 172 with a sliding sealing engagement at the second end of the housing.

In this embodiment, the piston rod 177 is connected to the first pin 142, and the housing 172 is connected (indirectly) to the second pin 144. Of course, in other embodiments, this could be reversed. The extending portion of the piston rod 177 is threaded at second end 179 to enable it to screw into a threaded hole in the second end of the first pin 142 and thus connect directly to the first pin. The first sealed end of the housing includes a threaded hole 169. A connection shaft 171 is threaded into the threaded hole 169 and connects to the second pin 144 to provide the connection between the hydraulic cylinder housing 172 and the second pin.

When the pins 142 and 144 are fully extended by the pin puller 150, the first end of the first pin 142 extends through the hole 140 of the first plate 138 and at least into the hole 140 of the second plate 139 of the first connector 135, and the first end of the second pin 144 extends through the hole 140 of the first plate 138 and at least into the hole 140 of the second plate 139 of the second connector 136. The linear actuator 170 has a stroke length that is at least as long as the combined distance that the first and second pins 142 and 144 travel between their retracted states (FIG. 8) and their extended states (FIG. 13).

In the embodiment of pin puller 150, the first and second support frame members are in the form of first and second round, hollow tubular members 160 and 162. The support frame members 160 and 162 provide support to hold the linear actuator in its operational position. FIGS. 10A and 10B show details of the support frame member 160. The first support frame member 160 includes a flange 186 on one end and a flange 188 on the opposite end, and an access opening 164 through which a tool can be inserted to connect the piston rod 177 to the first pin 142. The holes 165 shown in several spots along the length of the support frame member 162 (seen in FIGS. 5, 7 and 12) are simply for drainage and provide no other function. Flange 188 has an internal diameter that is smaller than the internal diameter of the tube to which it is attached. This produces an internal lip 189 against which the head of pin 142 rests when the pin 142 is fully extended. There is a chamfer on the internal diameter of lip 189 to help guide the pin 142 as it is directed through the central hole formed by lip 189. This internal diameter hole is close to the external diameter of the pin, which helps to center the pin 142 in the support frame member 160. There are four holes 187 in flange 186 that are used to connect the support frame member 160 to the length adjustment device 180.

While not shown in detail, the second support frame member 162 has similar flanges on its ends that serve the same purposes as flanges 186 and 188. The second support frame member 162 is also provided with a slot 166 though which hydraulic line connectors 167 and 168 on the hydraulic cylinder 170 extend radially and can travel axially as the hydraulic cylinder 170 moves within the second support frame member 162. The hydraulic cylinder 170 is thus held within the second support frame member 162 with a slidable engagement so that as the hydraulic cylinder 170 is actuated between the extended state and the retracted state, the housing 172 moves within the second support frame member 162. The cylinder moves relative to the support frame members to allow both pins to move the appropriate amount.

The length adjustment device 180 used in the pin puller 150 is best seen in FIG. 9. The length adjustment device 180 comprises two spacer plates 181, 182 with jacking bolts 183 between them. The role of the length adjustment device 180 is to allow the pin puller 150 to be installed while the length of the overall assembly is slightly shorter than the distance between the connectors 135 and 136, and then to be expanded outwardly so that the overall length matches that distance. The length of the length adjustment device 180 is adjusted so as to force the first support frame member 160 into contact with the first connector 135 and the second support frame member 162 into contact with the second connector 136. The degree of force needed to be generated by the jacking bolts is at least just enough to make contact between the support frame members and the connectors. That contact may be point, line, complete, face-to-face or edge contact. Once the pin puller 150 is in place in its working orientation, the pins will hold the pin puller in place, as explained more fully below. Thus the contact created by the length adjustment device 180 need not be one that involves much compressive force. The use of the length adjustment device 180 eliminates the need for exact or even any machining between the connectors 135 and 136 while allowing the pin puller 150 to adjust to the welded tolerance of insert 129.

The spacer plates 181, 182 further comprise extensions 161, 163 that are sized and placed so as to engage a banding lacing 134 on the lattice section to which the pin puller 150 is carried, to prevent rotation of the pin puller 150, and thus of the support frame members 160, 162. As best seen in FIG. 10C, the spacer plates include a center hole 184 that is used to center the piston rod 177, as well as four holes 185 used for the jacking bolts connecting the spacer plates together, as well as to the flanges on the ends of the tubular members 160 and 162. The two spacer plates 181, 182 may both be of the exact same shape and simply installed in the different orientations, as shown in FIG. 10.

The method of installing the pin puller has several steps, which may be carried out preferably, but not necessarily, in the following order. First, the first pin 142 is placed in the first support frame member 160. Second, the second pin 144 is placed in the second support frame member 162. Third, at least a part of the linear actuator is placed in at least one of the support frame members and connected to a second end of one of the first and second pins. This connection may be made before the linear actuator is placed in the support frame member. Fourth, the support frame members are placed between the two connectors 135, 136 so that the first and second pins are respectively aligned with the holes 140 in the first and second connectors, in the present case by being lined up with the holes 140 in the plates 138 of each connector. Preferably the support frame members are not connected together when the fourth step occurs. Fifth, a first end of the first pin is extended into the hole of the first connector. Sixth, a first end of the second pin is extended into the hole of the second connector. Seventh, the linear actuator is connected to a second end of the other of the first and second pins that were not involved in the third step. Eighth, the length of a length adjustment device is adjusted between the first and second support frame members to force the first support frame member into contact with the first connector and the second support frame member into contact with the second connector.

Note that the fourth step can occur for one of time support frame members prior to any of the other steps—i.e., the first support frame member 160 can be placed next to the first connector 135 before the first pin 142 is placed in it. Also note that the fifth and sixth steps can occur in either order, or simultaneously. The step of adjusting the length adjustment device 180 may be performed before the linear actuator 170 is connected to the other pin. In one preferred embodiment, the second pin 144, connection shaft 171 and hydraulic cylinder 170 are all connected together first and then placed in the second support frame member 162. In that embodiment, the linear actuator 170 is placed in the second support frame member 162 as part of the third step, and is connected to the second end of the first pin 142 in the seventh step. To facilitate this last connection, the rod 177 is provided with flats 178 adjacent the threaded portion 179 such that a wrench can be used as the tool to connect the hydraulic cylinder 170 to the first pin 142.

A preferred method of installing the pin puller 150 involves the following steps in the recited order. First, the support frame member 160 is held next to the hole 140 in plate 138 of connector 135. Pin 142 is then inserted through flange end 186 so that the first end of pin 142 passes through the hole surrounded by chamfered lip 189 and into the hole 140 far enough to hold the support frame member 160 in place. Second, connection shaft 171 is threaded into a threaded hole in the second end of pin 144. The shaft 171 is then threaded at its other end into threaded hole 169 in the sealed end 173 of the housing 172 of the hydraulic cylinder 170. This assembly is then placed into support frame member 162 until the pin 144 is flush with the end of support frame member 162. The piston rod 177 of hydraulic cylinder 170 will be sticking out of the other end of the second support frame member 162. Third, this assembly is then put in place next to the hole 140 in plate 138 of connector 136. The access opening 164 provides needed clearance for the end 179 of the piston rod of the hydraulic cylinder so that the second support frame member 162 can be put in line between the holes 140 in connectors 135 and 136. Pin 144 can then be pushed through the hole 140 in plate 138 of connector 136 far enough to hold the second support frame member 162 in place. This will allow the rod 177 to move to the left to the point that it no longer extends out of the end of the second support frame member 162. Fourth, the spacer plates 181 and 182 are put in place between the two inside ends of the support frame members 160 and 162. While extending the hydraulic cylinder, the rod 177 is then guided through the holes 184 in the spacer plates 181 and 182 and extended far enough that the pin 142 can be threaded onto the end 179 of the rod 177. The pins 142 and 144 include holes (not shown) that are used to hold them while the shaft 171 and rod 177 are tightened. As noted earlier, flats 178 on the end of rod 177 are used to tighten the rod 177 into the head of pin 142. Fifth, the jacking bolts 183 are then used with extra nuts in holes 185 and 187 to jack the spacer plates 181 and 182, and thus the support frame members 160 and 162 apart until they fit snug between the connectors 135 and 136.

With the pin puller 150 installed, the first pin 142 will have a first end located in the hole 140 of the first connector 135 and a second end inside the first support frame member 160; and the second pin 144 will have a first end located in the hole 140 of the second connector 136 and a second end inside the second support frame member 162. As used in this paragraph and the claims that use the same terms, the word "inside" simply means "at least partially surrounding". The linear actuator is moveable between i) an extended state wherein the pins are extended all of the way though the holes in the first and second connectors and ii) a retracted state wherein the first ends of each of the pins do not extend out of the holes of the connectors. For purposes of this paragraph and the claims that use the same terms, a "hole in a connector" is defined as all aligned holes in a connector if the connector has more than one plate and thus more than one hole, such as the plates 138 and 139. Also, the pin preferably will, but need not, pass all of the way through the hole of the outside plate and still be considered to pass all the way through the "hole" of the connector. Thus in the extended state of the embodiment of FIGS. 5-16, the pin 142 passes all of the way through the "hole" of the first connector 135 by passing all of the way through hole 140 in plate 138 and at least partially into the hole 140 of plate 139. Also, for this paragraph and claims that use the same terms, the phrase "the first ends of each of the pins do not extend out of the holes of the connectors" includes positions where the pin sticks out only to the extent that it does not interfere with male and female connectors sliding past one another. Thus in the retracted state, the first end of the pin 142 can extend through the hole 140 of plate 138 up to the point that it would interfere with a plate 147 from connector 146 fitting between plates 138 and 139. Of course it need not extend out of the hole 140 of plate 138, but rather can occupy part of the hole, as seen in FIG. 9.

Each of the first and second pins includes a small head at their second end, greater in diameter than the rest of the pin. This small head prevents the pins 142 and 144 from moving too far. Actuation of hydraulic cylinder 170 forces piston rod 177 to the left (from the perspective of FIG. 8), forcing pin 142 through the holes 140 in plates 138, 147 and 139, thus securing connectors 135 and 145 together for crane operation. The pin 142 stops when its head comes to rest against the lip 189 on flange 188. Further actuation extension of the cylinder 170 forces the housing 172 of the cylinder to the right, and connection shaft 171 transmits this movement to push pin 144 into its operational position until a head on the inside end of pin 144 contacts the lip of a flange like flange 188 but on the end of support frame member 162. Of course if there is less friction on the right hand side of the system, actuation extension of hydraulic cylinder 170 will force pin 144 into position first, and further extension will then force pin 142 into place. The head on the inside end of pins 142 and 144 prevents the pins from passing beyond their operational position shown in FIGS. 12-16. Thus upon extension of the hydraulic cylinder 170 the heads bottom out on the lip 189 and its counterpart at the end of support frame member 162, allowing a prescribed amount of each pin to be sticking into the bores of the plates 139 of connectors 135 and 136; and, upon the pins not moving concurrently with one another, the head stops the motion of the bottomed out pin to allow full hydraulic cylinder force to be applied to the non-moving pin. The pins could of course also bottom out on the connectors themselves. However, by using flange 188 with lip 189 on the support frame member 160 and a similar flange on support frame member 162, the forces exerted by the hydraulic cylinder 170 act only within the pin puller itself, and the connectors 135 and 136 do not need to be designed to withstand any side loading from the pin puller.

Retraction actuation of the hydraulic cylinder 170 pulls the pins 142 and 144 into the positions seen in FIGS. 7-11. In this case the plates 181 and 182 of the length adjustment device 180 mounted between the two support frames perform three separate functions. First, the extensions 161, 163 protrude out past the round banding lacing 134 of the lattice column section with the intent to provide rotational stability to the pin puller, keeping it at a consistent orientation to the column section mainly to prevent the hydraulic lines and the pin puller from twisting about. Secondly, the spacer plates 181, 182 are an integral part of guaranteeing that both pins move the appropriate amount upon retraction of the pins from the working position. Upon retraction of the pins, both pins may not move at the same time or rate based on the amount of load and friction on each pin. The spacer plates can stop the inward linear axial motion of either the close pin or the hydraulic cylinder to allow both pins to move the same prescribed amount. The inside end of pin 142 contacts plate 181, or alternatively the second end 174 of hydraulic cylinder 170 contacts plate 182 to prevent the pins from passing beyond their retracted position shown in FIGS. 7-11 and thus preventing either of pins 142 and 144 from coming out of their respective holes 140. This keeps the entire pin puller 150 in place between the connectors 135 and 136 so that it cannot fall out even when the pins are fully retracted. Third, holes 184 center the piston rod 177, and thus the hydraulic cylinder 170 in the second support frame member 162.

The pin puller 150 preferably also includes at least one keeper that can be engaged when the linear actuator is in its extended state to keep the pins 142, 144 fully extended though the holes of the connectors. In the embodiment of FIGS. 5-16 there are two keepers 190 and 192, best seen in FIGS. 9, 10, 14 and 15. The first keeper includes a first keeper plate 194 held in place between the first pin 142 and spacer plate 181 when it is engaged to prevent the pin 142 from retracting. The second keeper 192 also includes a keeper plate: second keeper plate 195 held in place between the linear actuator 170 and the spacer plate 182 to keep the linear actuator, and thus the second pin 144 from retracting. The first keeper 190 includes a first retaining pin 196 inserted through holes 193 in side flange members (FIG. 10A) on the first support frame member 160 adjacent the second end of the first pin 142 when the first pin is in an extended position. The second keeper 192 includes a second retaining pin 197 inserted through holes in side flange members on the second support frame member 162 adjacent the end 174 of the housing 172 when the second pin 144 is in an extended position.

Figure 17:
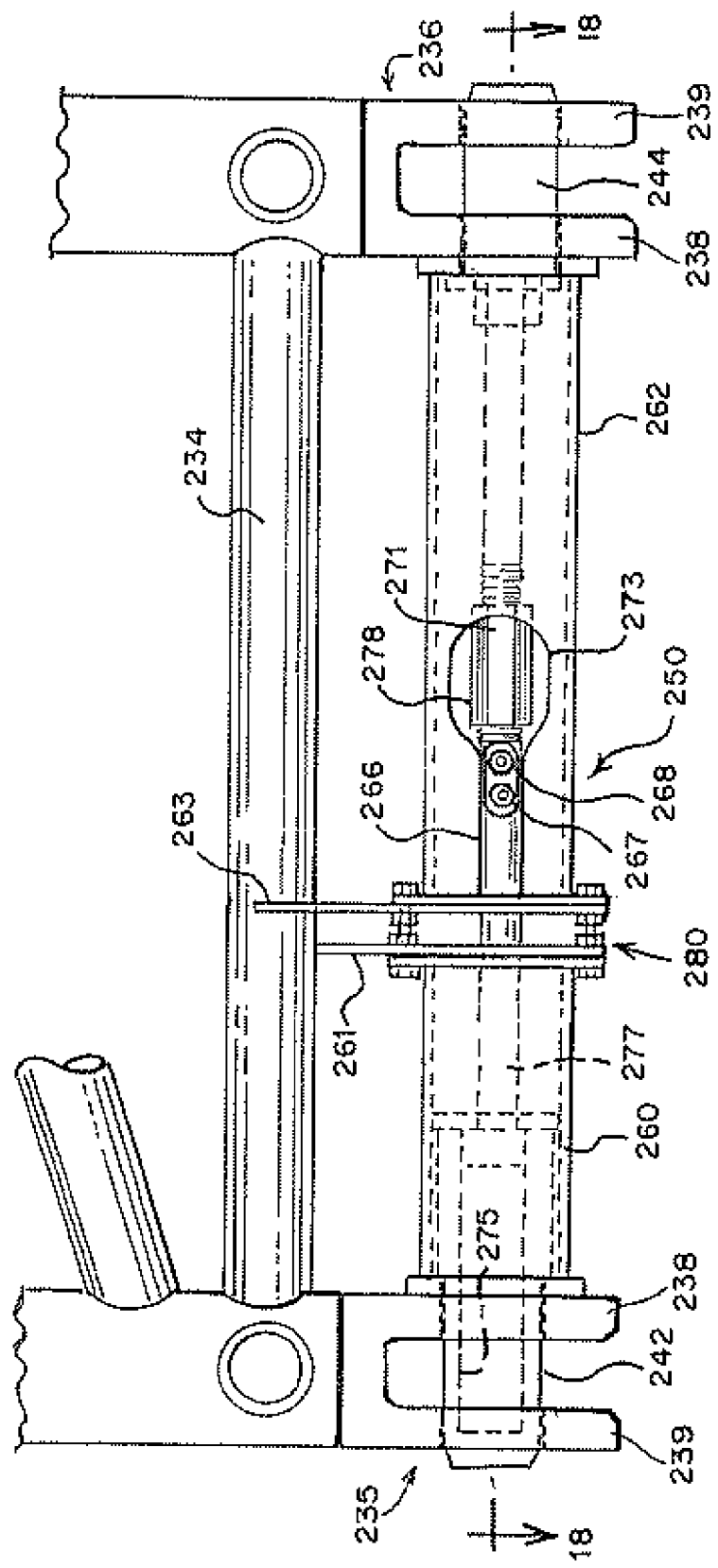
FIG. 17 is a view like FIG. 7 but of a second embodiment of a pin puller of the present invention.

Another embodiment of a pin puller 250 is shown in FIGS. 17-19. This embodiment is mounted between and used to connect connectors 235 and 236 on the ends of a lattice column segment just like pin puller 150 was mounted to and used to connect connectors 135, 136 on insert 129. The pin puller 250 is similar to pin puller 150 in many respects. However, in this embodiment, while the at least one linear actuator still comprises a hydraulic cylinder having a housing with a first sealed end, a piston inside the housing and a piston rod connected to the piston and extending out of a second end of the housing, in the pin puller 250, rather than using a separate housing 172 for the hydraulic cylinder, pin puller 250 uses a hollow space with an inside cylindrical surface 275 inside the first pin 242 to form the housing of the hydraulic cylinder. The piston rod 277 is connected to the second pin 244 in this embodiment. The piston rod 277 is fitted with hydraulic connectors and includes hydraulic flow channels 286 and 287 between the hydraulic connectors and the hollow space within the first pin. Fhrid forced in through hydraulic connector 267 and channel 286 will force the piston rod 277 to the right and the pin 242 to the left (as seen in FIG. 18), thus extending the pins 242 and 244 though the holes in the plates 238, 239 on the connectors 235 and 236, with plates 247 captured between plates 238 and 239 (FIG. 18). Alternatively, when hydraulic fluid is forced through hydraulic connector 268 and channel 287 it forces the piston rod 277 to the left and the pin 242 to the right, withdrawing the pins 242 and 244 from the holes through the plates 238, 239 and 247 so that the connectors 235 and 236 may be taken apart from plates 247 on the mating connector.

The pin puller 250 includes first and second support frame members 260 and 262, with a length adjustment device 280 between them that works just like first and second support frame members 160 and 162 and length adjustment device 180. Likewise, extensions 261, 263 that are sized and placed so as to engage a banding lacing 234 on the lattice section to which the pin puller 250 is carried, to prevent rotation of the support frame members 260, 262. Second support frame member 262 is provided with a slot 266 through which the hydraulic connectors can travel axially as the piston rod 277 moves within the first pin 242.

The pin puller 250 can be assembled and installed by placing the pin 242 and piston rod 277 into the first support frame member. Connection shaft 271 and second pin 244 are connected to one another and placed in second support frame member 262, and moving the support frame members 260 and 262 near to connectors 235 and 236. The two support frame members are then connected together with the length adjustment device 280 between them. A block 288 with the hydraulic connectors 267 and 268 is attached to the end of piston rod 277 after the end of piston rod 277 has passed through the spacer plates making up the length adjustment device. The block 288 includes 0-rings to make a fluid tight connection between the hydraulic connectors 267, 268 and the fluid channels 286 and 287. The second support frame member 262 includes an access opening and a tool is inserted through the access opening to connect the linear actuator to the second phi. In this regard, the slot 266 terminates in an open area 273 that provides access to a nut 278 used to connect the piston rod 277 and the connection shaft 271 that can be turned as a turnbuckle to force the pins 242, 244 out into the holes in plates 238 after the pin puller has been put in place between the connectors 235 and 236.

In the FIG. 17-19 embodiment, the linear actuator is supported by the support frame members by preventing it from rotating with respect to the support frame and restricting it from lateral movement.

Another embodiment of the invention is shown in FIGS. 20-24. Crane 310 is similar to crane 10 in that it includes a rotating bed 320 rotatably connected to the carbody 312 such that the rotating bed can swing with respect to the ground engaging members 314. The rotating bed supports a boom 322 pivotally mounted on a front portion of the rotating bed. In this embodiment, the pin puller is used to manipulate the pins that connect the boom 322 to the rotating bed 320. In this embodiment, the first and second connectors comprise connectors on a crane rotating bed to which a boom butt 324 is connected. As seen in FIG. 21, the boom butt 324 terminates in two spaced plates 337. The rotating bed has two sets of receiving connectors, each made of a set of plates 338 and 339. All of plates 337, 338 and 339 have holes 340 through them. When pins 342 and 344 are in place through these sets of holes (FIGS. 22 and 23), the boom butt 324 can pivot about the pins 342 and 344 with respect to the rotating bed 320.

The pin puller 350 used in this embodiment is very similar to pin puller 150. It includes first and second support frame members 360, 362; at least one linear actuator in the form of a double acting hydraulic cylinder 370 connected to the first and second pins 342, 344; and a device 380 having an adjustable length between the first and second support frame members 360, 362. The hydraulic cylinder includes a piston rod 377 that connects to the first pin 342. A connection shaft 371 is threaded into the threaded hole on the sealed end of the housing of the hydraulic cylinder and connects to the second pin 344 to provide the connection between the housing and the second pin. Actuation extension of the hydraulic cylinder 370 forces the piston rod 377 to the left to push pin 342 into place. A head on the inside end of pin 342 prevents the pin from passing beyond its operational position shown in FIGS. 22 and 23. Further actuation extension of the cylinder 370 forces the housing of the cylinder to the right, and connection shaft 371 transmits this movement to push pin 344 into its operational position until a head on the inside end of pin 344 contacts the end flange of support frame 362. Of course if there is less friction on the right hand side, actuation extension of hydraulic cylinder 370 will force pin 344 into position first, and further extension will then force pin 342 into place. Retraction of the pins 342 and 344 is achieved by actuation retraction of the piston rod 377 until the pins 342 and 344 are in the position seen in FIG. 24.

The pin puller 350 further comprises extensions that are sized and placed so as to engage structure on a part of the lift crane to which the pin puller is attached to prevent rotation of the support frame members relative to that crane part, in this case rotating bed 320. The extensions 361, 363 engage a bar 334 on the rotating bed to prevent rotation of the support frame members 360, 362, just as extensions 161 and 163 prevent pin puller 150 from rotating. In the plane of the view of line 23-23 of FIG. 22, only one of the extensions would be seen. However, both extensions are shown for sake of understanding.)

One additional feature used in the pin puller 350 that is not found in pin puller 150 relates to the fact that it is desirable in the pivotal connection of the boom butt 324 to the rotating bed 320 to keep the pins 342 and 344 from rotating when the boom butt 324 pivots. In the embodiment of FIGS. 21-24, the support frame members 360, 362 each include a slot 352, 354 (best seen in FIG. 21) and the first and second pins each include a tab 357, 358 on the second end of the pin that engages with one of the slots to prevent the pin from rotating with respect to the support frame member in which the second end of the pin is located. During retraction of the pins, the tabs 357, 358 will hit the end of their respective slot 352, 354 and limit further retraction of the pin 342, 344 beyond the positions shown in FIG. 24. Unlike pin puller 150, pin 342 and hydraulic cylinder 370 do not need to contact the spacer plates or the length adjustment device to limit pin movement.

Figure 25:
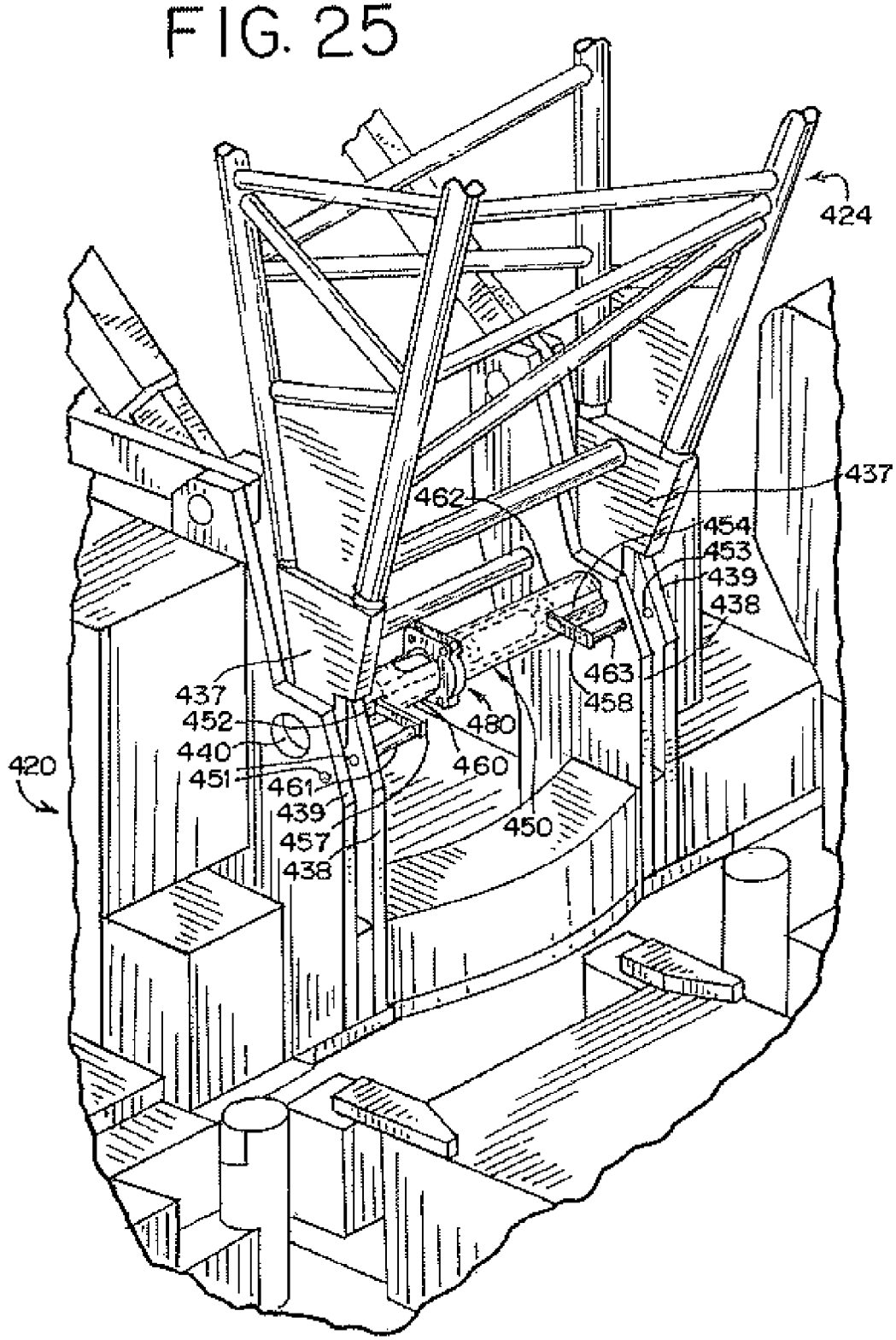
FIG. 25 is an enlarged partial front perspective view of the crane of FIG. 20 showing the mounting of another pin puller embodiment of the present invention to the boom hinge pins.
Figure 26:
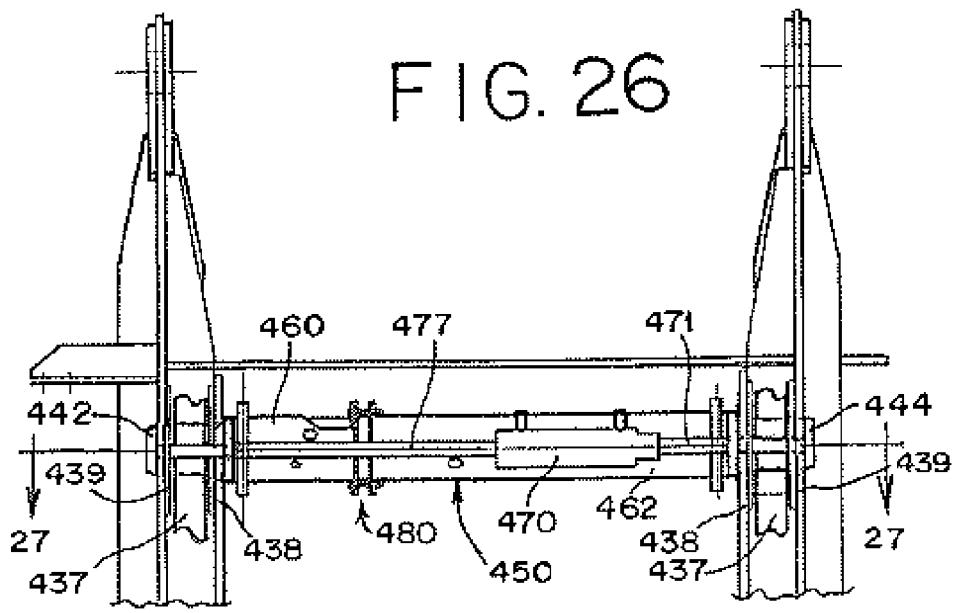
FIG. 26 is a partial front elevational view of the pin puller of FIG. 25 with the pins in an extended state.
Figure 27:
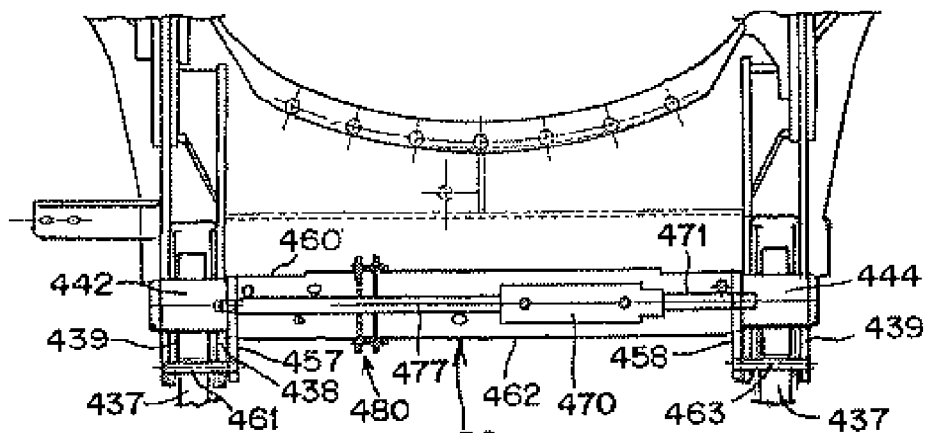
FIG. 27 is a view taken along line 27-27 of FIG. 26.
Figure 28:
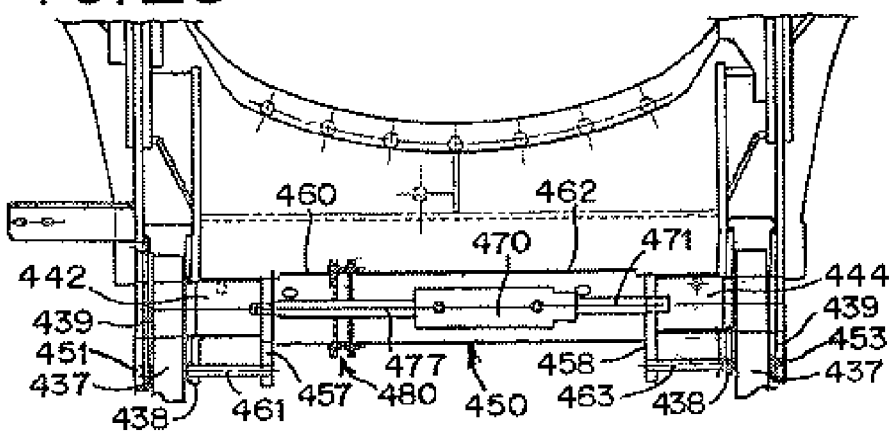
FIG. 28 is a view like FIG. 27 but with the pins in a retracted state.

The embodiment of pin puller 450 shown in FIGS. 25-28 is nearly identical to the pin puller 350. Pin puller 450 is used on a crane like crane 310 shown in FIG. 20, with a rotating bed 420 supporting a boom pivotally mounted on a front portion of the rotating bed. As with the embodiment of FIGS. 21-24, in this embodiment, the pin puller 450 is used to manipulate the pins that connect the boom butt 424 to the rotating bed 420. As seen in FIG. 25, the boom butt 424 terminates in two spaced plates 437. The rotating bed has two sets of receiving connectors, each made of a set of plates 438 and 439. All of plates 437, 438 and 439 have holes 440 through them. When pins 442 and 444 are in place through these sets of holes (FIGS. 26 and 27), the boom butt 424 can pivot about the pins 442 and 444 with respect to the rotating bed 420.

The pin puller 450 includes first and second support frame members 460, 462; a double acting hydraulic cylinder 470 with a piston rod 477 that connects to the first pin 442 and a connection shaft 471 threaded into a threaded hole on the sealed end of the housing of the hydraulic cylinder connected to the second pin 444; and a device 480 having an adjustable length between the first and second support frame members 460, 462.

Rather than using extensions like 361 and 363, the pin puller 450 uses a different structure to both prevent rotation of the support frame members relative to that crane rotating bed and rotation of the pins 442 and 444 when the boom butt 424 pivots. A first guide pin 461 fits through holes 451 through the plates 438 and 439 making up the first connector on the rotating bed. The guide pin 461 is connected to an extension 457 on the first pin 442 to keep the first pin from rotating with the boom butt. A second guide pin 463 fits through holes 453 through the plates 438 and 439 making up the second connector on the rotating bed. The guide pin 463 is connected to an extension 458 on the second pin 444 to keep the second pin from rotating with the boom butt. The extensions 457 and 458 move in slots 452 and 454 in the in the support frame members 460, 462 (best seen in FIG. 25). These slots thus prevent the support frame members from rotating with respect to the rotating bed 420. During retraction of the pins, the extensions 457, 458 will hit the end of their respective slots 452, 454 and limit further retraction of the pin 442, 444 beyond the positions shown in FIG. 28.

Figure 29:
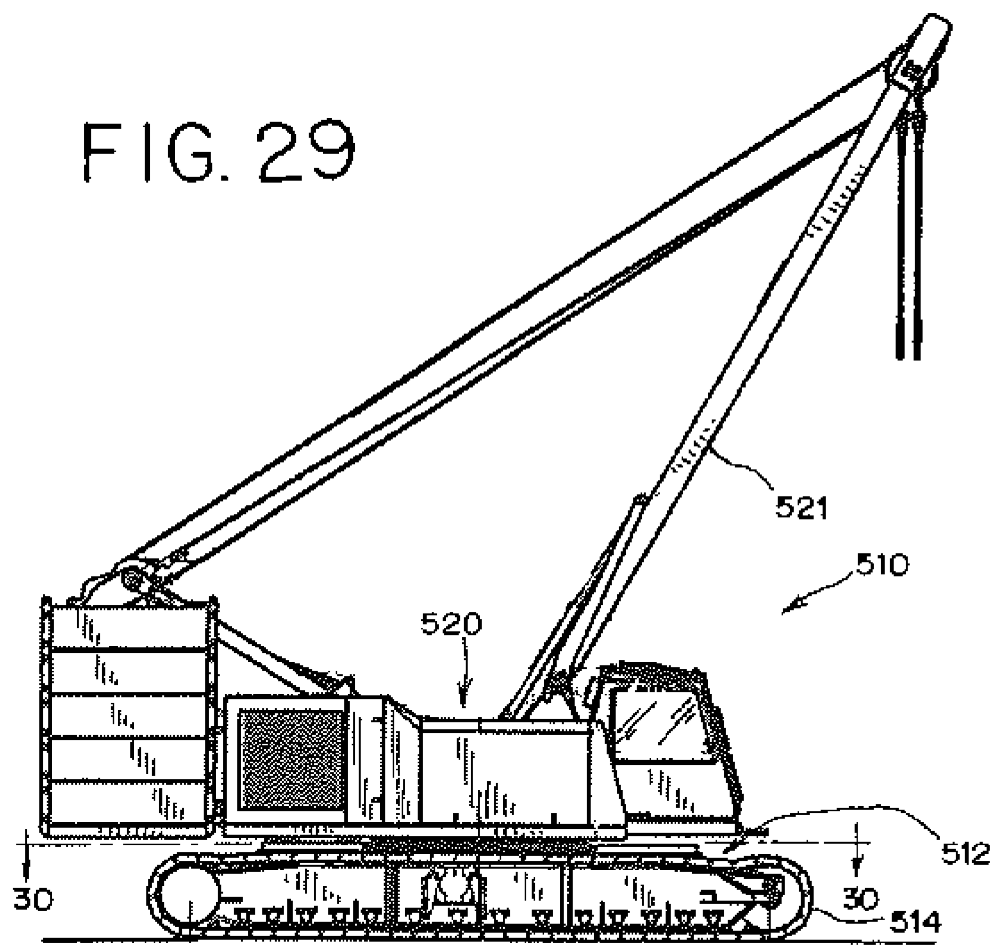
FIG. 29 is a side elevational view of a third mobile lift crane utilizing yet other embodiments of a pin puller of the present invention.

Another embodiment of the invention is shown in FIGS. 29-34. Crane 510 includes a rotating bed 520 rotatably connected to the carbody 512 such that the rotating bed can swing with respect to the ground engaging members 514. While FIG. 29 shows the crane 510 partially assembled, with the mast 521 positioned so that it can be used to assist in assembly of the crane 510, once the crane is fully assembled and operational, the rotating bed supports a boom (not shown) pivotally mounted on a front portion of the rotating bed. In this embodiment, the pin puller is used to manipulate the pins that connect the frame 530 of each crawler 514 to the carbody 512.

Figure 30:
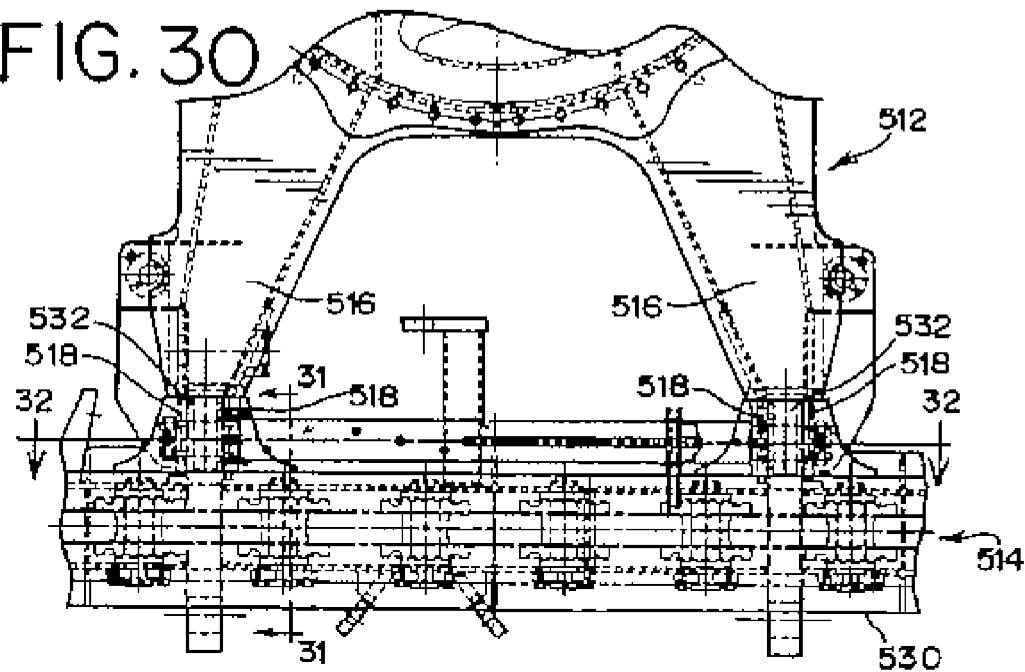
FIG. 30 is a partial cross-sectional view taken along line 30-30 of FIG. 29.
Figure 31:
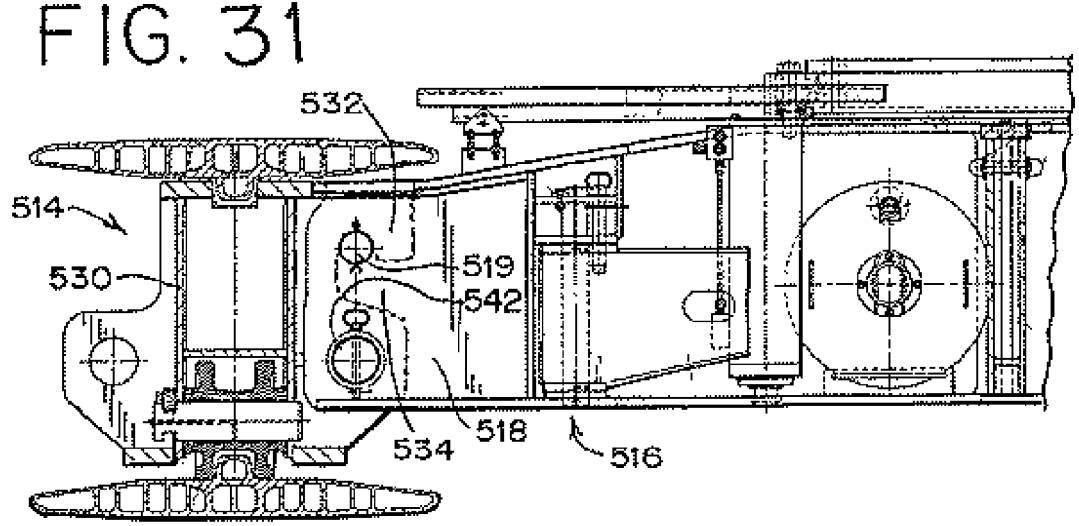
FIG. 31 is a cross-sectional view taken along line 31-31 of FIG. 30.
Figure 32:
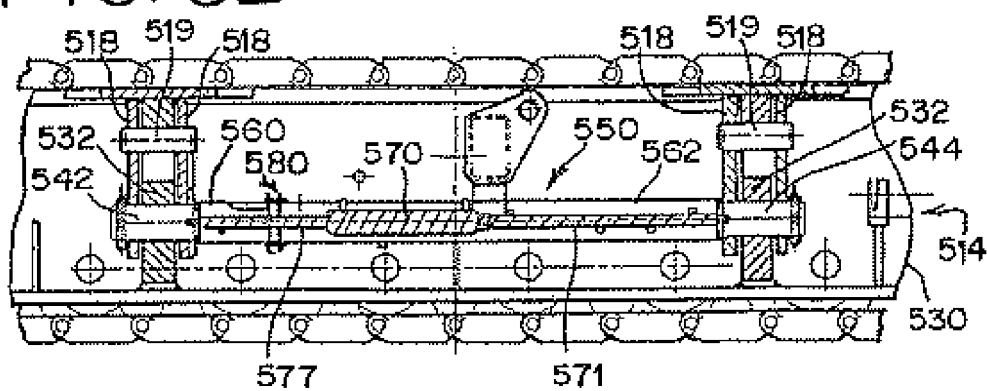
FIG. 32 is a cross-sectional view taken along line 32-32 of FIG. 30.
Figure 33:
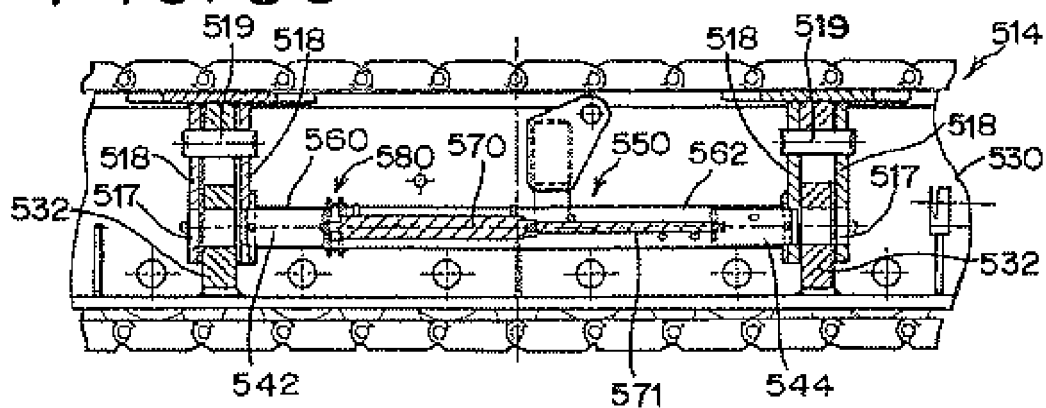
FIG. 33 is a cross-sectional view like FIG. 32 hit with the pins in a retracted state.

FIG. 30 shows that the carbody 512 has two legs 516 on each side that are used to mount a crawler 514 to the carbody 520. Each leg 516 has two plates 518 on its end with a top fixed pin 519 (FIGS. 31-34) through them that are used to connect the crawler frame. Each crawler frame 530 includes two connection plates 532 that fit in between the plates 518 on the legs 516 of the carbody 512. FIG. 31 shows that the plate 532 has an opening on its inside face with a channel 534 that allows the crawler frame 530 to be assembled by the mast 521 being used to lift the crawler into position next to the carbody legs with the frame 530 then dropped down so that the top fixed pin 519 follows the channel 534 until the frame 530 is in place. At that point the weight of the crawler 514 causes the frame to rotate about pin 519 until holes 517 (best seen in FIG. 33) in the lower half of plates 518 and a hole 540 (best seen in FIG. 34) in plate 532 are aligned. These holes 517 and 540 are used for the pins 542 and 544 that are manipulated by pin puller 550 of this embodiment.

The pin puller 550 used in this embodiment is very similar to pin puller 350. It includes first and second support frame members 560, 562; at least one linear actuator in the form of a double acting hydraulic cylinder 570 connected to the first and second pins 542, 544; and a device 580 having an adjustable length between the first and second support frame members 560, 562. The hydraulic cylinder includes a piston rod 577 that connects to the first pin 542. A connection shaft 571 is threaded into a threaded hole on the sealed end of the housing of the hydraulic cylinder and connects to the second pin 544 to provide the connection between the housing and the second pin 544.

Extensions 563 (best seen in FIG. 34) engage a portion (not shown) of the carbody leg 516 to prevent rotation of the support frame members 560, 562, just as extensions 361 and 363 prevent pin puller 350 from rotating. Also as with pin puller 350, in pin puller 550 the support frame members 560, 562 each include a slot 552, 554 (best seen in FIG. 34) and the first and second pins each include a tab 557, 558 on the second end of the pin that engages with one of the slots to prevent the pin from rotating with respect to the support frame member in which the second end of the pin is located. During retraction of the pins, the tabs 557, 558 will hit the end of their respective slot 552, 554 and limit further retraction of the pin 542, 544 beyond the positions shown in FIG. 34.

In the embodiment of the invention shown in FIG. 35, the pin puller 650, like pin puller 550, is used to connect a crawler frame to a carbody. The pin puller 650 is like pin puller 450 in that a first guide pin 661 fits through holes through the plates 638 and 639 making up the first connector on the carbody. The guide pin 661 is connected to an extension 657 on the first pin 642 to keep the first pin from rotating. A second guide pin 663 fits through holes through the plates 638 and 639 making up the second connector on the carbody. The guide pin 663 is connected to an extension 658 on the second pin 644 to keep the second pin from rotating. The extensions 657 and 658 move in slots 652 and 654 in the support frame members 660, 662.

In the preferred embodiments, the connectors 135, 136; 235, 236 comprise castings that are not machined to accept attachment of a pin puller, and only need to be machined for creating the holes like holes 140 for receiving the pins. Likewise the plates 338, 438, 518 and 638 used as the connectors in the other embodiments are not machined to accept the attachment of the pin pullers 350, 450, 550 and 660. In this way, the support frame members transmit the hydraulic cylinder force (force required to move the pins into and out of the working position) to the connectors without the need of being permanently attached to the parent component.

The preferred embodiments described above allow easier assembly of the lattice column sections or other crane components than with prior art pin pullers. With the present invention, pin pullers may be used on cast or fabricated column connectors, such as connectors on the ends of sections of a luffing jib strut or even sections of a boom or lattice mast. One pin puller is used to actuate two pins on opposite sides of the lattice section. The fact that no additional machining is required to the latticed column sections to accommodate the mounting of or allowing the operation of the pin puller reduces cost. Also, the pin puller is fully self-contained in that the support frames are not permanently (welded or other means) or temporarily (bolted or other means) attached to the parent component while still supporting its own weight and resisting the induced forces from the hydraulic cylinder without the need for additional attachment points or other rigid connection to the parent component. Since the pin puller is basically free floating, the pins are self-centering within the bores of the attaching structures. The pin puller can account for differences in manufacturing tolerance between the bearing surfaces of the cast connectors since it is not required to be accurately machined to a known dimension. In the preferred embodiments, both sliding keeper plates 190 and 192 are on one end of the pin puller, allowing activation of both keepers, and hence retention of both pins 142, 144, from a single location without the need to physically move to a separate location to activate a keeper plate.

The preferred embodiments can be implemented with minor size adjustments of its components to fit virtually any lattice column section that pins together using a single pin per pair of mating cast or fabricated connectors. The preferred embodiments can be implemented in a variety of locations other than lattice column sections where existing pin puller systems already exist, with the advantages of reduced machining, numbers of hydraulic cylinders, or substantial supporting structures.

It should be understood that various changes and modifications to the presently preferred embodiments described herein will be apparent to those skilled in the art. For example, the extensions 161 and 163 formed on spacer plates 181 and 182 could also be formed on the flanges on the ends of the support frame members, such as flange 186. The second keeper 192 could be moved to a position where the keeper is in the second support frame member 162 adjacent the second end of the second pin 144 when the second pin is in an extended position. Instead of two separate keepers, a single keeper that spanned the entire distance between the first pin 142 and the second end 174 of the hydraulic cylinder 170 could be used. Instead of using a plurality of jacking bolts 183, simple pins could be used to keep the spacer plates 181 and 182 parallel to one another and a single jacking bolt to adjust the space between the plates. Further, a single jacking bolt could be in the form of a hollow turnbuckle and be centered in the length adjustment device, with the piston rod 177 passing through it. The length adjustment device could also be like a pipe union, and connect directly onto the support frame members with left and right handed threads. Also, rather than using jacking bolts, the spacer plates could have the space between them adjusted using wedges or shims, or have cam shapes on mating surfaces so that rotation of one part relative to the other would cause the width of combination to change.

Instead of using one cylinder, the support frame members could support two hydraulic cylinders in a serial fashion.

The method steps recited above may be performed in different orders; accordingly, any order of listing such method steps in the appended claims does not imply a required order, unless specifically required by the language of a claim. Such changes and modifications can be made without departing from the spirit and scope of the present invention and without diminishing its intended advantages. It is therefore intended that such changes and modifications be covered by the appended claims.

The invention claimed is:

1. A pin puller mounted between first and second connectors, each of the connectors having a hole there though, the pin puller comprising:
   a) first and second support frame members;
   b) a first pin with a first end located in the hole of the first connector and a second end inside the first support frame member;
   c) a second pin with a first end located in the hole of the second connector and a second end inside the second support frame member;
   d) at least one linear actuator connected to the first and second pins, the at least one linear actuator moveable between i) an extended state wherein the pins are extended all of the way though the holes in the first and second connectors and ii) a retracted state wherein the first ends of each of the pins do not extend out of the holes of the connectors; and
   e) a length adjustment device comprising first and second spacer plates attached to the first and second support frame members, respectively, and jacking bolts extending between first and second spacer plates and engaged therewith, the length adjustment device configured to adjust the distance between the first and second spacer plates by turning the jacking bolts, such that the first support frame member is forced into contact with the first connector and the second support frame member is forced into contact with the second connector.

2. The mounted pin puller of claim 1 wherein the at least one linear actuator is supported by the first and second support frame members.

3. The mounted pin puller of claim 1 wherein the at least one linear actuator comprises a hydraulic cylinder having:
   i) a housing having a first sealed end, a second end and an inside cylindrical surface,
   ii) a piston slidably contained within the housing in a sealing engagement with the inside cylindrical surface of the housing, and
   iii) a piston rod having a first end connected to said piston and a second end extending out of the second end of the housing with a sliding sealing engagement at the second end of the housing.

4. The mounted pin puller of claim 3 wherein the piston rod is connected to the first pin and the housing is connected to the second pin.

5. The mounted pin puller of claim 4 wherein the sealed end of the housing includes a threaded hole and a connection shaft is threaded into said threaded hole and connects to the second pin to provide the connection between the housing and the second pin.

6. The mounted pin puller of claim 3 wherein the piston rod is connected to the second pin and the first pin has a hollow space with an inside cylindrical surface forming the housing of the hydraulic cylinder.

7. The mounted pin puller of claim 6 wherein the piston rod is fitted with hydraulic connectors and includes hydraulic flow channels between the hydraulic connectors and the hollow space within the first pin.

8. The mounted pin puller of claim 7 wherein the second support frame member is provided with a slot though which the hydraulic connectors can travel axially as the piston rod moves within the first pin.

9. The mounted pin puller of any one of claims 4 and 5 wherein the first support frame member includes an access opening configured to accommodate a tool inserted to connect the piston rod to the first pin.

10. The mounted pin puller of any one of claims 1 to 5 further comprising at least one keeper that can be engaged when the linear actuator is in said extended state to keep the pins extended though the holes of the connectors.

11. The mounted pin puller of claim 10 wherein the length adjustment device comprises first and second spacer plates with jacking bolts between them and wherein the at least one keeper comprises a first keeper plate that can be held in place between the first pin and the first spacer plate and a second keeper plate that can be held in place between the second spacer plate and the linear actuator.

12. The mounted pin puller of claim 10 wherein the at least one keeper comprises a first retaining pin inserted through holes in the first support frame member adjacent the second end of the first pin when the first pin is in an extended position, and a second retaining pin inserted through holes in the second support frame member adjacent the linear actuator.

13. The mounted pin puller of any one of claims 1 to 5 wherein each connector comprises first and second spaced plates that each have a hole there through, and when the pins are fully extended, the first end of the first pin extends through the hole of the first plate of the first connector and at least into the hole of the second plate of the first connector, and the first end of the second pin extends through the hole of the first plate of the second connector and at least into the hole of the second plate of the second connector.

14. The mounted pin puller of any one of claims 1 to 5 wherein the first and second connectors comprise connectors that are used to connect two parts of a lift crane together.

15. The mounted pin puller of claim 14 wherein the first and second connectors comprise connectors that are used to connect two lattice column sections together.

16. The mounted pin puller of claim 15 wherein the lattice column sections comprise sections of a luffing jib strut.

17. The mounted pin puller of claim 15 wherein the pin puller further comprises extensions that are sized and placed so as to engage a banding lacing on the lattice section to which the pin puller is carried to prevent rotation of the support frame members.

18. The mounted pin puller of claim 14 wherein the first and second connectors comprise connectors on a crane rotating bed to which a boom butt is connected.

19. The mounted pin puller of claim 18 further comprising a first guide pin through the first connector on the rotating bed and connected to the first pin to keep the first pin from rotating with the boom butt, and a second guide pin through the second connector on the rotating bed and connected to the second pin to keep the second pin from rotating with the boom butt.

20. The mounted pin puller of claim 14 wherein the pin puller further comprises extensions that are sized and placed so as to engage structure on a part of the lift crane to which the pin puller is attached to prevent rotation of the support frame members relative to that crane part, and wherein the support frame members each include a slot and the first and second pins each include a tab on the second end of the pin that engages with one of the slots to prevent the pin from rotating with respect to the support frame member in which the second end of the pin is located.

21. The mounted pin puller of claim 14 wherein the first and second connectors comprise connectors on a crane carbody that are used to connect a crawler frame to a carbody.

22. A crane utilizing the mounted pin puller of claim 14.

23. The mounted pin puller of any one of claims 1 to 5 wherein the support frame members are tubular.

24. The mounted pin puller of any one of claims 1 to 5 wherein the at least one linear actuator comprises a hydraulic cylinder and the second support frame member is provided with a slot though which hydraulic line connectors on the hydraulic cylinder extend radially and can travel axially as the hydraulic cylinder moves within the second support frame member.

25. The mounted pin puller of any one of claims 1 to 5 wherein the connectors comprise unmachined castings.

26. The mounted pin puller of any one of claims 1 to 5 wherein the at least one linear actuator comprises a double acting hydraulic cylinder having a housing and a rod, and a stroke length that is at least as long as the combined distance that the first and second pins travel between their retracted states and their extended states.

27. The mounted pin puller of claim 26 wherein the hydraulic cylinder is held within the second support frame member with a slidable engagement so that as the hydraulic cylinder is actuated between the extended state and the retracted state, the housing moves within the second support frame member.

28. A method of connecting a pin puller between first and second connectors each having a hole there through, wherein the pin puller comprises first and second support frame members, first and second pins and at least one linear actuator, the method comprising the steps of:
  a) placing the first pin in the first support frame member;
  b) placing the second pin in the second support frame member;
  c) placing at least a part of the at least one linear actuator in at least one of the support frame members wherein said part of the linear actuator is connected to a second end of one of the first and second pins;
  d) placing the support frame members between the two connectors so that the first and second pins are respectively aligned with the holes in the first and second connectors;
  e) extending a first end of the first pin into the hole of the first connector;
  f) extending a first end of the second pin into the hole of the second connector;
  g) connecting the linear actuator to a second end of the other of the first and second pins; and
  h) adjusting the length of a length adjustment device between the first and second support frame members to force the first support frame member into contact with the first connector and the second support frame member into contact with the second connector,
  wherein the length adjustment device comprises two spacer plates and jacking bolts between the spacer plates are used to adjust the length of the device.

29. The method of claim 28 wherein the at least one linear actuator is placed in the second support frame member in step c) and is connected to the second end of the first pin in step g).

30. The method of claim 29 wherein the at least one linear actuator comprises a hydraulic cylinder having a housing with a first sealed end, a piston inside the housing and a piston rod connected to the piston and extending out of a second end of the housing, and the extending portion of the piston rod is threaded to enable it to screw into a threaded hole in the second end of the first pin, and the rod is provided with flats adjacent the threaded portion such that a wrench can be used as the tool to connect the hydraulic cylinder to the first pin.

31. The method of claim 28 wherein step h) is performed before step g).

32. The method of claim 28 wherein the at least one linear actuator comprises a hydraulic cylinder having a housing with a first sealed end, a piston inside the housing and a piston rod connected to the piston and extending out of a second end of the housing, and wherein the first sealed end of the housing is connected to the second end of the second pin by a connection shaft and thereafter the second pin, connection shaft and hydraulic cylinder are placed in the second support frame member.

33. The method of claim 32 wherein the sealed end of the housing includes a threaded hole and a connection shaft is threaded into said threaded hole and connected to the second pin to provide the connection between the housing and the second pin.

34. The method of any one of claims 28 to 33 wherein the at least one linear actuator comprises a hydraulic cylinder having a housing with a first sealed end, a piston inside the housing and a piston rod connected to the piston and extending out of a second end of the housing, wherein the first pin has a hollow space with an inside cylindrical surface forming the housing of the hydraulic cylinder, and the piston rod is connected to the second pin.

35. The method of any one of claims 28 to 33 wherein the second support frame member includes an access opening and a tool is inserted through the access opening to connect the linear actuator to the second pin.

36. The method of any one of claims 28 to 33 and 30 wherein the length adjustment device comprises two spacer plates and jacking bolts between the spacer plates are used to adjust the length of the device.

37. The method of any one of claims 28 to 33 and 30 wherein each of the first and second pins include a head at their second end greater in diameter than the rest of the pin.

\* \* \* \* \*